United States Patent
Choi et al.

(10) Patent No.: US 11,039,441 B2
(45) Date of Patent: *Jun. 15, 2021

(54) METHOD AND APPARATUS FOR ALLOCATING WIRELESS RESOURCE IN ORDER TO PREVENT INTERFERENCE IN WIRELESS LAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,662

(22) Filed: Dec. 12, 2019

(65) Prior Publication Data

US 2020/0120677 A1 Apr. 16, 2020

Related U.S. Application Data

(63) Continuation of application No. 16/275,248, filed on Feb. 13, 2019, now Pat. No. 10,512,088, which is a
(Continued)

(51) Int. Cl.
*H04W 72/04* (2009.01)
*H04W 84/12* (2009.01)
(Continued)

(52) U.S. Cl.
CPC ....... *H04W 72/0453* (2013.01); *H04L 5/0037* (2013.01); *H04W 72/042* (2013.01); *H04W 72/08* (2013.01); *H04W 84/12* (2013.01)

(58) Field of Classification Search
CPC .......... H04W 72/0453; H04W 72/042; H04W 84/12; H04W 74/006; H04L 5/0007
See application file for complete search history.

(56) References Cited

U.S. PATENT DOCUMENTS

| 8,270,435 B2 | 9/2012 | Olszewski |
| 9,844,028 B2 * | 12/2017 | Yang .................. H04L 27/2602 |

(Continued)

FOREIGN PATENT DOCUMENTS

| CN | 101765990 | 6/2010 |
| CN | 102113359 | 6/2011 |

(Continued)

OTHER PUBLICATIONS

U.S. Appl. No. 16/108,016, Notice of Allowance dated Nov. 7, 2018, 22 pages.

(Continued)

*Primary Examiner* — Hoang-Chuong Q Vu
(74) *Attorney, Agent, or Firm* — Lee, Hong, Degerman, Kang & Waimey

(57) ABSTRACT

Disclosed is a method and apparatus for allocating a wireless resource in order to prevent interference in a wireless LAN. A method for allocating a wireless resource in a wireless LAN may comprise the steps of: allocating, by an AP, a plurality of wireless resources for a plurality of STAs included in a BSS, in the entire bandwidth, respectively; and transmitting, by the AP, a PPDU to the plurality of STAs through the plurality of wireless resources, respectively, wherein each of the plurality of wireless resources is a combination of a plurality of wireless units defined in different sizes on a frequency axis, and each of the plurality of wireless resources can be determined in consideration of (Continued)

the size of the bandwidth of at least one STA supporting a bandwidth smaller than the size of the entire bandwidth from among the plurality of STAs.

18 Claims, 15 Drawing Sheets

Related U.S. Application Data continuation of application No. 16/108,016, filed on Aug. 21, 2018, now Pat. No. 10,251,177, which is a continuation of application No. 15/504,007, filed as application No. PCT/KR2015/008221 on Aug. 5, 2015, now Pat. No. 10,085,262.

(60) Provisional application No. 62/044,334, filed on Aug. 5, 2014, provisional application No. 62/043,406, filed on Aug. 28, 2014, provisional application No. 62/039,425, filed on Aug. 20, 2014, provisional application No. 62/038,376, filed on Aug. 18, 2014, provisional application No. 62/038,794, filed on Aug. 18, 2014, provisional application No. 62/037,114, filed on Aug. 14, 2014.

(51) Int. Cl.
*H04W 72/08* (2009.01)
*H04L 5/00* (2006.01)

(56) References Cited

U.S. PATENT DOCUMENTS

| | | | |
|---|---|---|---|
| 10,292,146 B2 | 5/2019 | Choi et al. | |
| 2008/0025267 A1 | 1/2008 | Wei et al. | |
| 2009/0060006 A1 | 3/2009 | Liu et al. | |
| 2010/0182903 A1 | 7/2010 | Palanki et al. | |
| 2010/0202347 A1 | 8/2010 | Sridhara et al. | |
| 2011/0188441 A1 | 8/2011 | Kim et al. | |
| 2011/0211541 A1* | 9/2011 | Yuk | H04L 25/03834 370/329 |
| 2011/0255620 A1 | 10/2011 | Jones, IV et al. | |
| 2012/0236853 A1 | 9/2012 | Kim et al. | |
| 2012/0320845 A1 | 12/2012 | Choi et al. | |
| 2012/0327915 A1 | 12/2012 | Kang et al. | |
| 2013/0070623 A1 | 3/2013 | Chun et al. | |
| 2014/0105123 A1 | 4/2014 | Kenney et al. | |
| 2014/0169356 A1 | 6/2014 | Noh et al. | |
| 2015/0334708 A1 | 11/2015 | Lee et al. | |
| 2015/0349995 A1* | 12/2015 | Zhang | H04L 1/0042 375/295 |
| 2015/0358117 A1 | 12/2015 | Li et al. | |
| 2015/0381330 A1 | 12/2015 | Chen et al. | |
| 2016/0050666 A1* | 2/2016 | Yang | H04L 1/0041 370/329 |
| 2016/0057754 A1* | 2/2016 | Azizi | H04L 5/0039 370/329 |
| 2016/0142187 A1 | 5/2016 | Yang et al. | |
| 2016/0211944 A1 | 7/2016 | Kenney et al. | |
| 2017/0230952 A1 | 8/2017 | Choi et al. | |
| 2017/0280453 A1 | 9/2017 | Choi et al. | |
| 2018/0006793 A1 | 1/2018 | Azizi et al. | |
| 2018/0006861 A1 | 1/2018 | Sudo | |
| 2018/0359758 A1 | 12/2018 | Choi et al. | |
| 2019/0182835 A1 | 6/2019 | Choi et al. | |

FOREIGN PATENT DOCUMENTS

| | | |
|---|---|---|
| CN | 102388561 | 3/2012 |
| CN | 103079278 | 5/2013 |
| KR | 1020130037507 | 4/2013 |
| WO | 2011108832 | 9/2011 |
| WO | 2013073921 | 5/2013 |
| WO | 2014047444 | 3/2014 |

OTHER PUBLICATIONS

U.S. Appl. No. 16/275,248, Notice of Allowance dated Jul. 25, 2019, 30 pages.
Korean Intellectual Property Office Application No. 10-2017-7003764, Notice of Allowance dated Sep. 5, 2018, 2 pages.
European Patent Office Application Serial No. 15832002.8, Search Report dated Feb. 23, 2018, 7 pages.
Japan Patent Office Application No. 2017-508043, Notice of Allowance dated Mar. 19, 2018, 3 pages.
Jinsoo Choi, et al, LG Electronics, "Discussion on OFDMA in HEW," IEEE 11-13/1382r0, Nov. 11, 2013, 11 pgs.
PCT International Application No. PCT/KR2015/008221, International Search Report dated Nov. 13, 2015, 4 pages.
The State Intellectual Property Office of the People's Republic of China Application Serial No. 201580052650.3, Office Action dated Sep. 3, 2019, 6 pages.
U.S. Appl. No. 15/504,007, Notice of Allowance dated May 22, 2018, 16 pages.

\* cited by examiner

FIG. 1
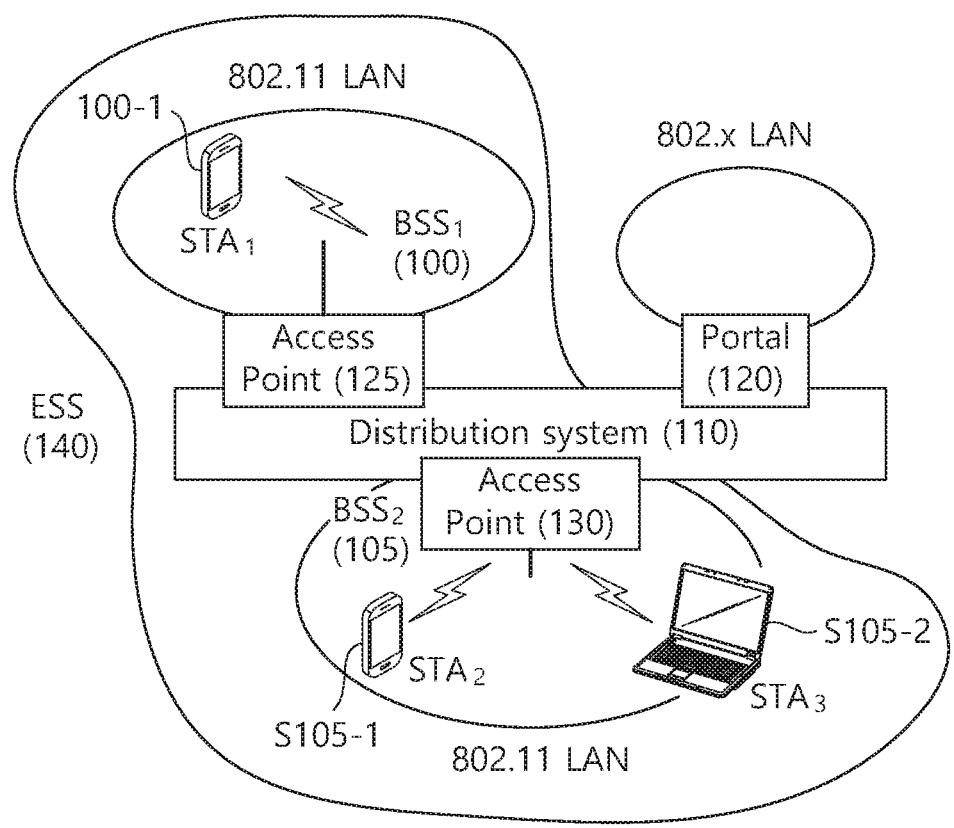
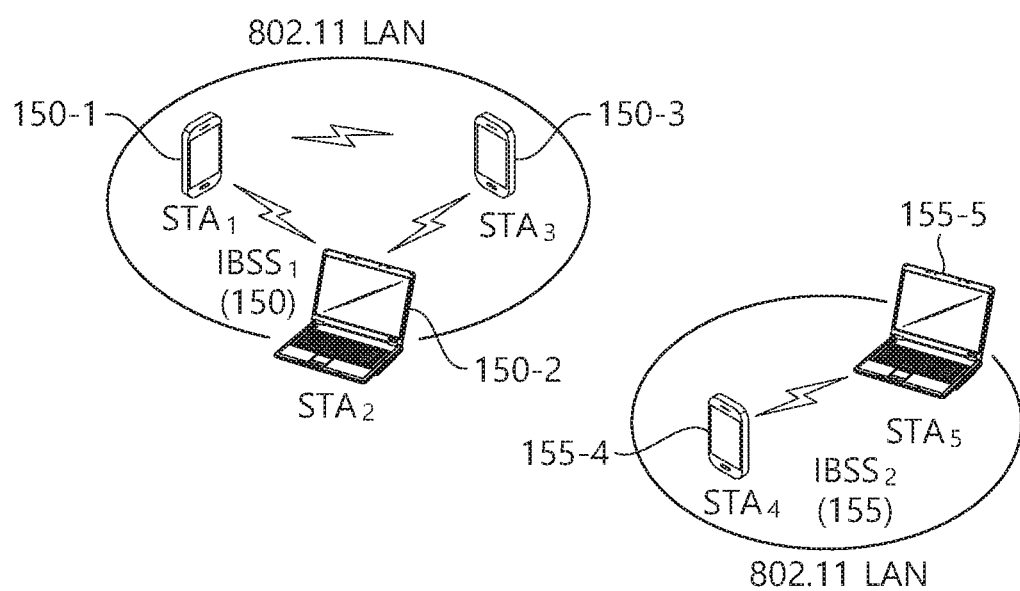

METHOD AND APPARATUS FOR ALLOCATING WIRELESS RESOURCE IN ORDER TO PREVENT INTERFERENCE IN WIRELESS LAN

This application is a continuation of U.S. patent application Ser. No. 16/275,248, filed on Feb. 13, 2019, now U.S. Pat. No. 10,512,088, which is a continuation of U.S. patent application Ser. No. 16/108,016, filed on Aug. 21, 2018, now U.S. Pat. No. 10,251,177, which is a continuation of U.S. patent application Ser. No. 15/504,007, filed on Feb. 14, 2017, now U.S. Pat. No. 10,085,262, which is the National Stage filing under 35 U.S.C. 371 of International Application No. PCT/KR2015/008221, filed on Aug. 5, 2015, which claims the benefit of U.S. Provisional Application No. 62/037,114, filed on Aug. 14, 2014, 62/038,376, filed on Aug. 18, 2014, 62/038,794, filed on Aug. 18, 2014, 62/039,425, filed on Aug. 20, 2014, 62/043,406, filed on Aug. 28, 2014, and 62/044,334, filed on Sep. 1, 2014, the contents of which are all hereby incorporated by reference herein in their entirety.

BACKGROUND OF THE INVENTION

Field of the Invention

The present invention relates to wireless communication and, most particularly, to a method and apparatus for allocating a wireless resource for the transmission or reception of data in a wireless LAN.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication.

When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

An object of the present invention is to provide a method for allocating a wireless resource for the transmission or reception of data in a wireless LAN.

Another object of the present invention is to provide an apparatus for allocating a wireless resource for the transmission or reception of data in a wireless LAN.

Technical Solutions

In order to achieve the above-described technical object of the present invention, according to an aspect of the present invention, a method for allocating wireless resources in a wireless LAN may include the steps of allocating, by an access point (AP), a plurality of wireless resources for each of a plurality of stations (STAs) being included in a basic service set (BSS) within an entire bandwidth, and transmitting, by the AP, a physical protocol data unit (PPDU) to each of the plurality of STAs through each of the plurality wireless resources, wherein each of the plurality of resource units corresponds to a combination of a plurality of wireless resource units each being defined to have a different size within a frequency axis, and wherein each of the plurality of resource units is determined by considering a bandwidth size of at least one STA, among the plurality of STAs, the at least one STA supporting a bandwidth having a size smaller than that of the entire bandwidth.

In order to achieve the above-described technical object of the present invention, according to another aspect of the present invention, an access point (AP) allocating wireless resources in a wireless LAN may include a radio frequency (RF) unit transmitting and/or receiving radio signals, and a processor being operatively connected to the RF unit, wherein the processor is configured to allocate a plurality of wireless resources for each of a plurality of stations (STAs) being included in a basic service set (BSS) within an entire bandwidth, and to transmit a physical protocol data unit (PPDU) to each of the plurality of STAs through each of the plurality wireless resources, wherein each of the plurality of resource units corresponds to a combination of a plurality of wireless resource units each being defined to have a different size within a frequency axis, and wherein each of the plurality of resource units is determined by considering a bandwidth size of at least one STA, among the plurality of STAs, the at least one STA supporting a bandwidth having a size smaller than that of the entire bandwidth.

Effects of the Invention

When allocating resources for each of a plurality of stations (STAs) based on orthogonal frequency division multiple access (OFDMA), since wireless (or radio) resource units that are defined to have sizes being different from one another may be allocated to each of the plurality of STAs, scheduling flexibility may be enhanced and throughput of the wireless LAN may also be increased.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
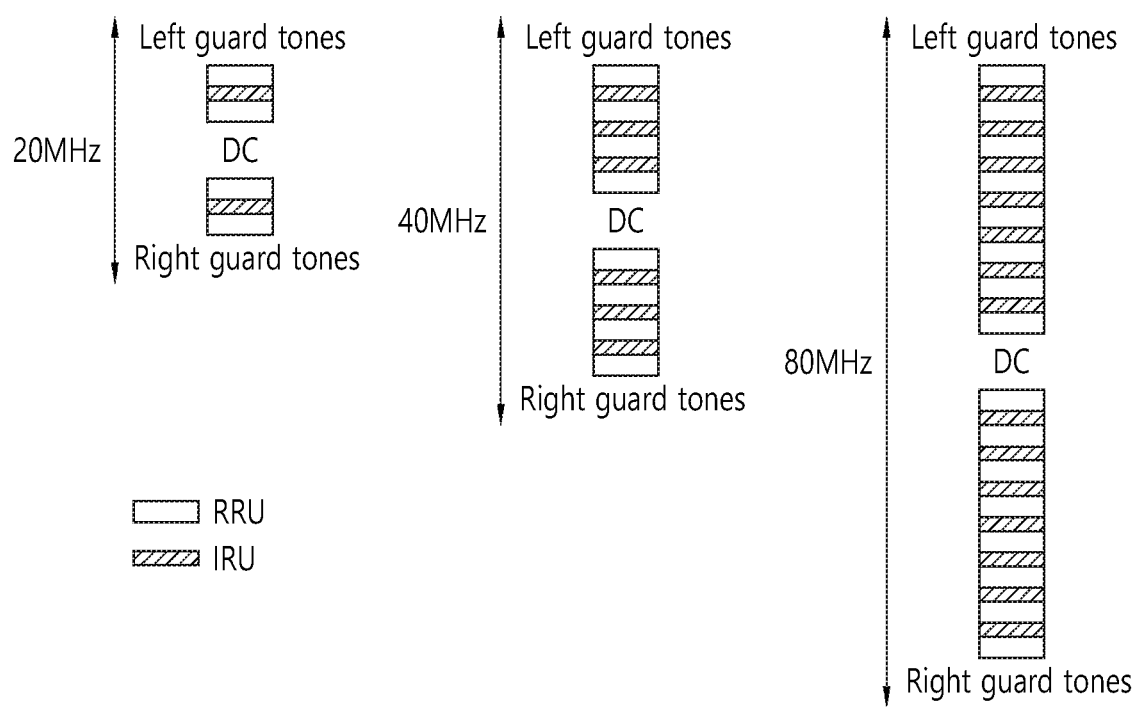
FIG. 2 is a conceptual view illustrating a resource allocation method according to an exemplary embodiment of the present invention.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the MSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

A new frame format for implementing a next generation wireless LAN system is required to be defined. In case a new frame format for the implementation of a next generation wireless LAN system is defined, a legacy frame format for legacy user equipments (STAs and APs) supporting the conventional (or legacy) wireless LAN system and the new frame format for the next generation wireless LAN system co-exist in the wireless LAN network. The legacy user equipment cannot know about the management of the next generation wireless LAN and the characteristics of the next generation wireless LAN. Therefore, a frame structure (or frame format) for the next generation wireless LAN is required to be designed without causing any influence on the performance of the legacy user equipments. Similarly, a physical protocol data unit (PPDU) structure for the next generation wireless LAN is required to be designed without causing any influence on the performance of the legacy user equipments.

In the related art wireless LAN system, a multi-channel allocation method for allocating a wider bandwidth (e.g., a bandwidth exceeding 20 MHz) to one user equipment was used. In case one channel unit is said to be equal to 20 MHz, a multi-channel may include a plurality of 20 MHz channels. In the multi-channel allocation method, a primary channel rule was used in order to allocate a wider bandwidth to the user equipment. In case the primary channel rule is used, limitations (or restrictions) in allocating a wider bandwidth to the user equipment exists. More specifically, according to the primary channel rule, in case a secondary channel, which is adjacent to the primary channel is 'busy' due to its usage in an overlapped BBS (OBBS), the STA cannot use the remaining channels excluding the primary channel. Therefore, since the STA can only transmit a frame through the primary channel, the STA undergoes restrictions in transmitting a frame through a multi-channel. Therefore, since the STA can transmit frames only through the primary channel, the STA undergoes restrictions in transmitting frames through a multi-channel. More specifically, the primary channel rule, which was used for multi-channel allocation in the legacy wireless LAN system may cause considerable restrictions in gaining a high throughput by managing a wide (or wider) bandwidth in the current wireless LAN environment, wherein a large number of OBBSs exist.

In order to resolve such problems, a wireless LAN system supporting an orthogonal frequency division multiple access (OFDMA) technology is disclosed in the exemplary embodiment of the present invention. In case the OFDMA technology is used, the multi-channel may be used by not just one user equipment but by multiple user equipments simultaneously without any restrictions caused by the primary channel rule. Therefore, since a wider bandwidth management is possible, the efficiency in the management of the wireless resources may be enhanced.

In case a maximum usage of OFDM numerology of the related art wireless LAN system is carried out for the resource allocation that is based on the OFDMA, it will be advantageous in that data encoding and interleaver designs, and so on, that were used in the related art wireless LAN system may be re-used. However, in case an unscalable OFDM numerology method of the related art is used without any modification, when transmitting data traffic by using the OFDMA based resource allocation, it may be difficult to perform transmission of diverse sizes of data traffic and allocation of diverse sizes of resources, and, accordingly, it may be difficult to ensure scheduling flexibility.

Moreover, in case the related art OFDM numerology is used without modification, the support of a diversity mode (distributed resource allocation), which is supported in the OFDMA transmission, may also become complicated, and the design of the wireless LAN system may become more complicated due to the diversity in the number of leftover tones (or leftover subcarriers) according to the bandwidth size.

An example of a time-frequency structure that is assumed in the wireless LAN system according to the exemplary embodiment of the present invention may be as shown below.

A fast fourier transform (FFT) size/inverse fast fourier transform (IFFT) size may be defined to be equal to N times (wherein N is an integer, e.g., N=4) of the FFT/IFFT sizes that were used in the legacy wireless LAN system. For example, 256FFT/IFFT may be applied for a bandwidth of 20 MHz, 512FFT/IFFT may be applied for a bandwidth of 40 MHz, 1024FFT/IFFT may be applied for a bandwidth of 80 MHz, or 2048FFT/IFFT may be applied for a consecutive bandwidth of 160 MHz or a non-consecutive bandwidth of 160 MHz.

Subcarrier spacing may be equal to 1/N times (wherein N is an integer, e.g., 78.125 kHz when N=4) of the subcarrier spacing that was used in the legacy wireless LAN system.

An inverse discrete fourier transform (IDFT)/discrete fourier transform (DFT) length (or valid symbol length) that is based on IDFT/DFT (or FFT/IFFT) may be equal to N times the IDFT/DFT length used in the legacy wireless LAN system. For example, in case the IDFT/DFT length is equal to 3.2 μs and N=4 in the legacy wireless LAN system, the IDFT/DFT length in the wireless LAN system according to the exemplary embodiment of the present invention may be equal to 3.2 μs*4(= 12.8 μs).

The length of an OFDM symbol may correspond to a value wherein a guard interval (GI) length is added to an IDFT/DFT length. The length of a GI may be equal to diverse values, such as 0.4 μs, 0.8 μs, 1.6 μs, 2.4 μs, and 3.2 μs.

In case of using the OFDMA based resource allocation method according to the exemplary embodiment of the present invention, different sizes of resource allocation units may be used. More specifically, a regular resource unit (RRU) and an irregular resource unit (IRU) may be defined for the resource allocation based on OFDMA.

An AP may determine a downlink transmission resource and/or uplink transmission resource for at least one STA based on the plurality of resource units. The AP may transmit at least one PPDU to at least one STA through the downlink transmission resource. Moreover, the AP may receive at least one PPDU being transmitted by at least one STA through the uplink transmission resource.

The RRU may correspond to the resource unit having the relatively larger size (larger size resource unit) as compared to the IRU. The RRU may be defined based on the size of the bandwidth that was supported in the legacy wireless LAN system. For example, the RRU may be defined to have the sizes of 26 tones, 56 tones, 114 tones, and 242 tones. The RRU may be defined to have the same size regardless of the size of the bandwidth that is available for usage (e.g., 20 MHz, 40 MHz, 80 MHz, 160 MHz, etc.), or the RRU may be defined to have a size that is subordinate to the size of the bandwidth that is available for usage. For example, with an increase in the size of the bandwidth that is available for usage, the size of the RRU may also be defined to have a relatively larger size. A tone may be interpreted to have the same meaning as a subcarrier.

The IRU may correspond to the resource unit having the relatively smaller size (smaller size resource unit) as compared to the RRU.

As another term, the RRU may be expressed as a basic tone unit (BTU), and the IRU may be expressed as a small tone unit (STU).

Resource units, such as the RRU and the IRU, may be allocated within the entire bandwidth by considering a left guard tone and a right guard tone, which are respectively allocated at each end of the entire bandwidth for interference alleviation, and a direct current (DC) tone, which is located at the center of the entire bandwidth. The number of left guard tones, right guard tones, and DC tones may each correspond to a number that is not subordinate to the total size of the entire bandwidth and may each correspond to a fixed number regardless of the size of the entire bandwidth. For example, the number of left guard tones/right guard tones may be equal to 6/5 or 7/6, and the number of DC tones may be equal to 5 or 3.

The allocation method (allocation number, allocation location, etc.) of resource units, such as the RRU and the IRU, may be configured by considering resource application efficiency, scalability (or extendibility) according to the entire bandwidth. The allocation method of the resource units, such as the RRU and the IRU, may be defined in advance or may be signaled based on diverse methods (e.g., signaling based on a signal field that is included in a PPDU header of a PPDU).

For example, for a systematic allocation of resource units within the entire bandwidth, the sum of the number of tones allocated to the RRU and the number of tones allocated to the IRU is essentially set to be a divisor of 256 (e.g., 128, 64, 32, etc.), and then, the RRU and the IRU, which are connected to be consecutive to one another, may be consecutively repeated within the entire bandwidth. Additionally, the sum of the number of left guard tones, right guard tones, and DC tones may be set to be equal to the number of tones corresponding to at least one IRU (e.g., the number of tones corresponding to 2 IRUs).

In case the resource allocation is carried out based on the above-described method, the resource allocation may be performed in a format, such as left guard tone/RRU/IRU/RRU/IRU/ . . . /RRU/DC tone/RRU/IRU . . . /RRU/right guard tone. In case the resource allocation is performed as described above, the number of RRUs being allocated within the entire bandwidth may be 2 times larger than the number of IRUs being allocated within the entire bandwidth.

In case the number of tones allocated to the IRU is small, a plurality (e.g., 2) physical IRUs may be grouped (or bundled) so as to be defined as a logical IRU, which may be used as a minimum unit for resource allocation. For example, two IRUs that are adjacent to one another within the entire bandwidth may be defined as one logical IRU. In order to configure two physical IRUs that are adjacent to one another as one logical IRU, by changing the positions of the IRU and the RRU in the structure shown below in FIG. 2, a new format of left guard tone/RRU/IRU/RRU/RRU/IRU/RRU . . . , i.e., a structure wherein RRU/IRU/RRU is repeated may be configured. In case the positions of the IRUs and the RRUs are changed near the DC tone, two IRUs may be adjacent to one another near the DC tone, and the two adjacent IRUs located near the DC tone may be collectively defined as one logical IRU.

Additionally, according to the exemplary embodiment of the present invention, in case the uplink transmission from the STA to the AP is carried out, a resource unit having a small size, such as the IRU may not be allocated as the uplink resource in order to alleviate the interference between the users. Moreover, in accordance with the change in the number of tones being allocated to each of the left guard tones, the right guard tones, and the DC tones, at least one or more IRUs may not be allocated in the above-described resource allocation method.

Additionally, according to the exemplary embodiment of the present invention, the above-described methods may be combined by hybrid combination so as to carry out resource allocation.

Moreover, according to the exemplary embodiment of the present invention, one RRU may be logically divided into a plurality of small RRUs (or sub-RRUs) so as to gain a diversity effect. For example, one RRU being allocated to 242 tones may be divided into 2 sub-RRUs each being allocated to 121 tones or 22 sub-RRUs each being allocated to 11 tones. One RRU being allocated to 114 tones may be divided into 2 sub-RRUs each being allocated to 57 tones or 6 sub-RRUs each being allocated to 9 tones. One RRU being allocated to 56 tones may be divided into 2 sub-RRUs each being allocated to 28 tones or 4 sub-RRUs each being allocated to 14 tones. One RRU being allocated to 26 tones may be divided into 2 sub-RRUs each being allocated to 13.

Each of the plurality of sub-RRUs being included in one RRU, which is described above, may be allocated to a plurality of STAs. For example, each of the plurality of sub-RRUs being included in each of the plurality of RRUs may be allocated as resource for one STA. In other words, the resource for one STA may cover a plurality of RRUs. More specifically, for example, in case 26 tones are allocated for one STA, 2 sub-RRUs each being allocated to 13 tones and each being included in 2 RRUs that are allocated to the 26 tones may be allocated as resource for one STA. In case the above-described resource allocation method is used, the diversity effect may be gained.

Furthermore, according to the exemplary embodiment of the present invention, in case of a pilot subcarrier (or pilot tone or pilot) within an IRU, in case one pilot subcarrier is allocated to the IRU, the pilot subcarrier may be allocated to a subcarrier that is located at the center of the IRU, and, in case two pilot subcarriers are allocated to the IRU, each of the 2 pilot subcarriers may be respectively allocated to subcarriers located between each end of the IRU and the subcarrier located at the center of the IRU.

FIG. 2 is a conceptual view illustrating a resource allocation method according to an exemplary embodiment of the present invention.

FIG. 2 discloses a resource allocation according to the size of the entire bandwidth, in a case when the number of tones being allocated to the RRU (or also referred to as a basic resource unit (BRU)) is equal to 56 and when the number of tones being allocated to the IRU is equal to 8. In case 56 tones are allocated to the RRU, the same basic OFDM numerology that is used in 20 MHz in the legacy wireless LAN system may be used. Therefore, an interleaver (or data tone interleaver) that was used in the legacy wireless LAN system may be re-used.

Additionally, the sum of the number of tones allocated to the RRU (hereinafter, a RRU size may also be used in the same meaning) and the number of tones allocated to the IRU (hereinafter, an IRU size may also be used in the same meaning) is equal to 64, which is a divisor of 256. Therefore, a systematic design may be easily configured.

Resource allocation for 20 MHz is disclosed on the left side of FIG. 2, resource allocation for 40 MHz is disclosed at the center of FIG. 2, and resource allocation for 80 MHz is disclosed on the right side of FIG. 2. Resource allocation for 160 MHz may correspond to a structure where in the resource allocation for 80 MHz is repeated. Each of the RRU and the IRU, which correspond to two resource units, may be allocated to each independent STA. Alternatively, depending upon the system environment, two resource units (RRU, IRU) may be simultaneously allocated to one STA.

In case the RRU size is equal to 56 tones and the IRU size is equal to 8 tones, the number of RRU allocations, the number of IRU allocations, and the number of DC tones and guard tones for each bandwidth size may be as shown below in Table 1. Table 1 discloses the numerology for each bandwidth size.

TABLE 1

| BW | Number of RRUs | Number of IRUs | Number of DC tones and number of guard tones (guard subcarriers) |
|---|---|---|---|
| 20 MHz | 4 (224 tones) | 2 (16 tones) | 16 (DC: 5, GS: 11 or DC: 3, GS: 13) |

TABLE 1-continued

| BW | Number of RRUs | Number of IRUs | Number of DC tones and number of guard tones (guard subcarriers) |
|---|---|---|---|
| 40 MHz | 8 (448 tones) | 6 (48 tones) | 16 (DC: 5, GS: 11 or DC: 3, GS: 13) |
| 80 MHz | 16 (896 tones) | 14 (112 tones) | 16 (DC: 5, GS: 11 or DC: 3, GS: 13) |

Referring to Table 1, in the 20 MHz bandwidth, 4 RRUs and 2 IRUs may be allocated, and, in the 40 MHz bandwidth, 8 RRUs and 6 IRUs may be allocated, and, in the 80 MHz bandwidth, 16 RRUs and 14 IRUs may be allocated.

More specifically, in the 20 MHz bandwidth, resource allocation may be performed in a structure (or format) of left guard tone/RRU/IRU/RRU/DC tone/RRU/IRU/RRU/right guard tone. Similarly, in the 40 MHz bandwidth and the 80 MHz bandwidth, resource allocation may be performed in the structure of left guard tone/RRU/IRU/RRU/IRU/RRU/ . . . /IRU/RRU/DC tone/RRU/IRU/ . . . /RRU/IRU/RRU/IRU/RRU/right guard tone. RRUs may be respectively allocated at locations adjacent to the left guard tone and the right guard tone, and, thereafter, IRU/RRU may be repeatedly allocated toward the direction of the DC tone from each guard tone, and, herein, resource allocation may be performed so that RRUs are adjacent to the DC tone. As described above, by changing the allocated positions of the RRU and the IRU near the DC tone, so that the IRU can be located near the DC tone, as described above, the resource allocation may also be performed in the structure of / . . . /RRU/RRU/IRU/DC tone/IRU/RRU/RRU/ . . . /.

Resource allocation for the 160 MHz bandwidth may be performed based on a repetition of the resource allocation for the 80 MHz bandwidth. Therefore, 32 RRUs and 28 IRUs may be allocated in the 160 MHz bandwidth.

Additionally, referring to Table 1, the sum of the number of DC tones and the number of guard tones (the sum of the number of left guard tones and the number of right guard tones) may be equal to a fixed value (e.g., 16) regardless of the bandwidth. The sum of the number of DC tones and the number of guard tones may be equal to a multiple of the IRU size.

As described above, although individual IRU units may be allocated to the STA, two physical IRUs may be bundled (or grouped) so as to be allocated as wireless resource for the STA in a logical IRU unit. As shown in FIG. 2, in case the IRU size is equal to 8 tones, the size of the logical tone may be equal to 16 tones, and 16 tones may be used as a minimum resource allocation unit. Hereinafter, in the exemplary embodiment of the present invention, a resource allocation unit that is configured by grouping n (wherein n is an integer) number of physical IRUs may be expressed by the term logical nIRU. The locations of the plurality of IRUs configuring the logical nIRU may be adjacent or consecutive to one another or may be allocated without considering whether or not the IRUs are adjacent to one another. The logical nIRU may correspond to a minimum resource allocation unit. For example, the resource allocation unit that is configured by grouping two physical IRUs may be expressed by the term logical 2IRU.

According to the exemplary embodiment of the present invention, the IRU size may vary. Hereinafter, in case the RRU size is equal to 56 tones, the IRU size is equal to 13 tones or 9 tones instead of 8 tones, the following resource allocation is disclosed.

Table 2 shown below discloses the resource allocation corresponding to the 80 MHz bandwidth, in case the RRU size is equal to 56 tones and the IRU size is equal to 13 tones.

TABLE 2

|  | Number of tones | Number of units | Total number of tones |
|---|---|---|---|
| RRU | 56 | 15 | 840 |
| IRU | 13 | 13 | 169 |
| Left guard tone |  |  | 6 |
| Right guard tone |  |  | 5 |
| DC |  |  | 4 |
|  |  |  | 1024 |

Table 3 shown below discloses the resource allocation corresponding to the 40 MHz bandwidth, in case the RRU size is equal to 56 tones and the IRU size is equal to 13 tones.

TABLE 3

|  | Number of tones | Number of units | Total number of tones |
|---|---|---|---|
| RRU | 56 | 7 | 392 |
| IRU | 13 | 8 | 104 |
| left guard |  |  | 6 |
| right guard |  |  | 5 |
| DC |  |  | 5 |
|  |  |  | 512 |

Table 4 shown below discloses the resource allocation corresponding to the 20 MHz bandwidth, in case the RRU size is equal to 56 tones and the IRU size is equal to 13 tones.

TABLE 4

|  | Number of tones | Number of units | Total number of tones |
|---|---|---|---|
| RRU | 56 | 4 | 224 |
| IRU | 13 | 1 | 13 |
| left guard |  |  | 6 |
| right guard |  |  | 5 |
| DC |  |  | 8 |
|  |  |  | 256 |

Table 5 shown below discloses the resource allocation corresponding to the 20 MHz/40 MHz/80 MHz bandwidths, in case the RRU size is equal to 56 tones and the IRU size is equal to 9 tones.

TABLE 5

| BW | Number of RRUs | Number of IRUs | Sum of the number of DC tones and the number of GS tones |
|---|---|---|---|
| 20 MHz | 4 (224 tones) | 2 (18 tones) | 14 (DC: 3, GS: 11) |
| 40 MHz | 8 (448 tones) | 5 (45 tones) | 19 (DC: 8, GS: 11 or DC: 3, GS: 16) |
| 80 MHz | 16 (896 tones) | 12 (108 tones) | 20 (DC: 3, GS: 17 or DC: 9, GS: 11) |

Additionally, according to the exemplary embodiment of the present invention, the RRU size may also vary. Hereinafter, in case the RRU size is equal to 26 tones, the IRU size is equal to 8 tones, the following resource allocation is disclosed. A number of RRUs and a number of IRUs that are larger than the case when the RRU size is equal to 56 tones may be allocated to the entire bandwidth. Also, in case the RRU size is equal to 26 tones, resource allocation may be supported at a more accurate granularity as compared to the case when the RRU size is equal to 52 tones.

Table 6 shown below discloses the resource allocation corresponding to the 20 MHz/40 MHz/80 MHz bandwidths, in case the RRU size is equal to 26 tones and the IRU size is equal to 13 tones.

TABLE 6

| BW | Number of RRUs | Number of IRUs | Sum of the number of DC tones and the number of GS tones |
|---|---|---|---|
| 20 MHz | 8 (208 tones) | 4 (32 tones) | 16 (DC: 5, GS: 11 or DC: 3, GS: 13) |
| 40 MHz | 16 (416 tones) | 10 (80 tones) | 16 (DC: 5, GS: 11 or DC: 3, GS: 13) |
| 80 MHz | 32 (832 tones) | 22 (176 tones) | 16 (DC: 5, GS: 11 or DC: 3, GS: 13) |

Table 7 shown below discloses the resource allocation corresponding to the 80 MHz bandwidth, in case the RRU size is equal to 26 tones and the IRU size is equal to 6 tones.

TABLE 7

|  | Number of tones | Number of units | Total number of tones |
|---|---|---|---|
| RRU | 26 | 32 | 832 |
| IRU | 6 | 30 | 180 |
| left guard |  |  | 5 |
| right guard |  |  | 4 |
| DC |  |  | 3 |
|  |  |  | 1024 |

Table 8 shown below discloses the resource allocation corresponding to the 40 MHz bandwidth, in case the RRU size is equal to 26 tones and the IRU size is equal to 6 tones.

TABLE 8

|  | Number of tones | Number of units | Total number of tones |
|---|---|---|---|
| RRU | 26 | 16 | 416 |
| IRU | 6 | 14 | 84 |
| left guard |  |  | 5 |
| right guard |  |  | 4 |
| DC |  |  | 3 |
|  |  |  | 512 |

Table 9 shown below discloses the resource allocation corresponding to the 20 MHz bandwidth, in case the RRU size is equal to 26 tones and the IRU size is equal to 6 tones.

TABLE 9

|  | Number of tones | Number of units | Total number of tones |
|---|---|---|---|
| RRU | 26 | 8 | 208 |
| IRU | 6 | 6 | 36 |
| left guard |  |  | 5 |
| right guard |  |  | 4 |
| DC |  |  | 3 |
|  |  |  | 256 |

Moreover, according to the exemplary embodiment of the present invention, the RRU size may be equal to 114 tones and the IRU size may be equal to 7 tones. Table 10 to Table 12 shown below respectively disclose resource allocations corresponding to a case when the RRU size is equal to 114 tones and the IRU size is equal to 7 tones.

Table 10 shown below discloses the resource allocation corresponding to the 80 MHz bandwidth, in case the RRU size is equal to 114 tones and the IRU size is equal to 7 tones.

TABLE 10

|  | Number of tones | Number of units | Total number of tones |
|---|---|---|---|
| RRU | 114 | 8 | 912 |
| IRU | 7 | 14 | 98 |
| left guard |  |  | 6 |
| right guard |  |  | 5 |
| DC |  |  | 3 |
|  |  |  | 1024 |

Table 11 shown below discloses the resource allocation corresponding to the 40 MHz bandwidth, in case the RRU size is equal to 114 tones and the IRU size is equal to 7 tones.

TABLE 11

|  | Number of tones | Number of units | Total number of tones |
|---|---|---|---|
| RRU | 114 | 4 | 456 |
| IRU | 7 | 6 | 42 |
| left guard |  |  | 6 |
| right guard |  |  | 5 |
| DC |  |  | 3 |
|  |  |  | 512 |

Table 12 shown below discloses the resource allocation corresponding to the 20 MHz bandwidth, in case the RRU size is equal to 114 tones and the IRU size is equal to 7 tones.

TABLE 12

|  | Number of tones | Number of units | Total number of tones |
|---|---|---|---|
| RRU | 114 | 2 | 228 |
| IRU | 7 | 2 | 14 |
| left guard |  |  | 6 |
| right guard |  |  | 5 |
| DC |  |  | 3 |
|  |  |  | 256 |

In case the RRU size is equal to 114 tones and the IRU size is equal to 7 tones, the resource allocation corresponding to the 80 MHz/40 MHz/20 MHz bandwidths may be performed as shown below.

80 MHz: Left guard(6)/RRU(114)/logical 2IRU(14)/RRU (114)/logical 2IRU(14)/RRU(114)/logical 2IRU(14)/RRU (114)/IRU(7)/DC(3)/IRU(7)/RRU(114)/logical 2IRU(14)/ RRU(114)/logical 2IRU(14)/RRU(114)/logical 2IRU(14)/ RRU(114)/right guard (5)

40 MHz: Left guard(6)/RRU(114)/logical 2IRU(14)/RRU (114)/IRU(7)/DC(3)/IRU(7)/RRU(114)/logical 2IRU(14)/ RRU(114)/right guard (5)

20 MHz: Left guard(6)/RRU(114)/IRU(7)/DC(3)/IRU(7)/ RRU(114)/right guard (5)

In the above-described 20 MHz/40 MHz/80 MHz allocation, the positions of each of the RRUs, IRUs, and logical 2IRUs may vary within the entire bandwidth.

Alternatively, considering the diversity, the resource allocation in each of 80 MHz/40 MHz/20 MHz may be performed as described below.

80 MHz: Left guard(6)/IRU(7)/RRU(114)/logical 2IRU (14)/RRU(114)/IRU(7)/RRU(114)/logical 2IRU(14)/RRU (114)/IRU(7)/DC(3)/IRU(7)/RRU(114)/logical 2IRU(14)/ RRU(114)/IRU(7)/RRU(114)/logical 2IRU(14)/RRU(114)/ IRU(7)/right guard (5)

40 MHz: Left guard(6)/IRU(7)/RRU(114)/IRU(7)/RRU (114)/IRU(7)/DC(3)/IRU(7)/RRU(114)/IRU(7)/RRU(114)/ IRU(7)/right guard (5)

20 MHz: Left guard(6)/IRU(7)/RRU(114)/DC(3)/RRU (114)/IRU(7)/right guard (5)

The above-described resource allocation is merely exemplary, and, therefore, resource allocation that is based on the RRU/IRU within the entire bandwidth may also be performed by using diverse methods other than the above-described resource allocation.

Figure 3:
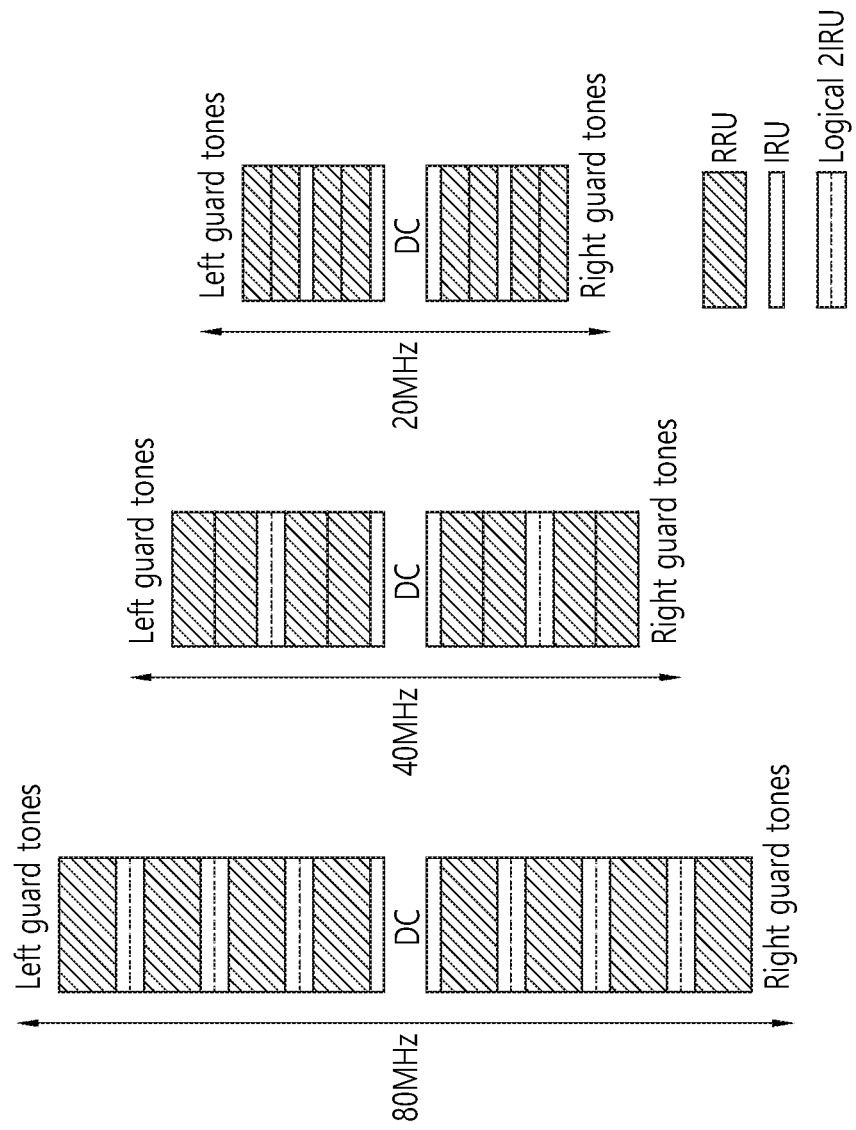
FIG. 3 is a conceptual view illustrating a resource allocation method according to an exemplary embodiment of the present invention.

FIG. 3 is a conceptual view illustrating a resource allocation method according to an exemplary embodiment of the present invention.

FIG. 3 discloses a method of varying the RRU size in accordance with the size of the entire bandwidth.

Referring to FIG. 3, in case the size of the entire bandwidth is equal to 20 MHz, the RRU size may be equal to 26 tones, and, in case the size of the entire bandwidth is equal to 40 MHz, the RRU size may be equal to 56 tones, and, in case the size of the entire bandwidth is equal to 80 MHz, the RRU size may be equal to 26 tones.

The IRU size may be defined to be equal to a fixed value (e.g., 7 tones) that remains unchanged in accordance with the entire bandwidth, and 14 tones corresponding to the logical 2IRU may be used as the minimum resource allocation unit. The logical 2IRU corresponding to 14 tones may include two pilot subcarriers (or pilot tones). Among the 14 tones corresponding to the minimum resource allocation unit, 12 tones excluding the 2 pilot subcarriers may be used as data tones. The 12 data tones may facilitate the support of diverse modulation and coding scheme (MCS) decoding. Most particularly, in 80 MHz, the sum of the RRU size and the minimum allocation unit (two IRUs) corresponds to RRU+2IRU=114 tones+14 tones=128 tones, which corresponds to a divisor of 256.

The left side of FIG. 3 discloses RRU/IRU allocated to 80 MHz.

Referring to the left side of FIG. 3, left guard tone/RRU (114)/logical 2IRU(14)/RRU(114)/logical 2IRU(14)/RRU (114)/logical 2IRU(14)/RRU(114)/IRU(7)/DC/IRU(7)/ RRU(114)/logical 2IRU(14)/RRU(114)/logical 2IRU(14)/ RRU(114)/logical 2IRU(14)/RRU(114)/right guard tone may be allocated within the entire bandwidth.

The center of FIG. 3 discloses RRU/IRU allocated to 40 MHz.

Referring to the center of FIG. 3, left guard tone/RRU (56)/RRU(56)/logical 2IRU(14)/RRU(56)/RRU(56)/IRU (7)/DC/IRU(7)/RRU(56)/RRU(56)/logical 2IRU(14)/RRU (56)/RRU(56)/right guard tone may be allocated within the entire bandwidth.

The right side of FIG. 3 discloses RRU/IRU allocated to 20 MHz.

Referring to the right side of FIG. 3, left guard tone/RRU (26)/RRU(26)/IRU(7)/RRU(26)/RRU(26)/IRU(7)/DC/IRU (7)/RRU(26)/RRU(26)/IRU(7)/RRU(26)/RRU(26)/right guard tone may be allocated within the entire bandwidth.

In FIG. 3, the disclosed positions corresponding to each of the RRUs, IRUs, and logical 2IRU within the entire bandwidth correspond to exemplary positions. Each of the RRUs, IRUs, and logical 2IRU may be diversely allocated within the entire bandwidth.

Figure 4:
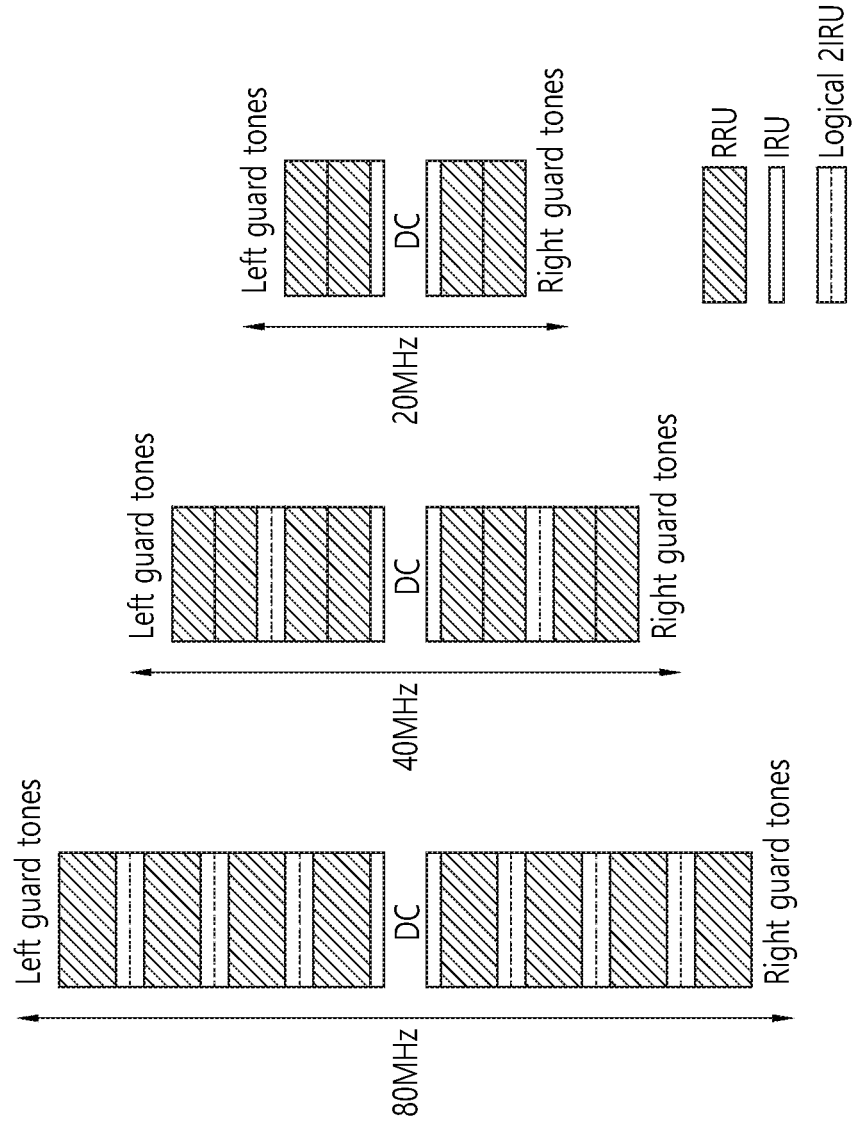
FIG. 4 is a conceptual view illustrating a resource allocation method according to an exemplary embodiment of the present invention.

FIG. 4 is a conceptual view illustrating a resource allocation method according to an exemplary embodiment of the present invention.

For example, in order to re-use the legacy OFDM numerology, in 80 MHz, the minimum granularity may be set to 10 MHz (114 tones), and, in 40 MHz, the minimum granularity may be set to 5 MHz (56 tones), and, in 20 MHz, the minimum granularity may be set to 2.5 MHz (26 tones).

Alternatively, since the 80 MHz bandwidth is a dominant bandwidth of the system, the 80 MHz bandwidth is optimized to one resource granularity, and the remaining bandwidths may be designed to inclusively support one granularity.

Hereinafter, in case the minimum granularity in 80 MHz is equal to 10 MHz and the minimum granularity in each of 40 MHz and 20 MHz is respectively equal to 5 MHz, Table 13 to Table 15 respectively disclose resource allocations in each of 80 MHz, 40 MHz, and 20 MHz bandwidths.

Table 13 shown below discloses a case when the minimum granularity is equal to 10 MHz in the 80 MHz bandwidth.

TABLE 13

|  | Number of tones | Number of units | Total number of tones |
| --- | --- | --- | --- |
| RRU | 114 | 8 | 912 |
| IRU | 7 | 14 | 98 |
| left guard |  |  | 6 |
| right guard |  |  | 5 |
| DC |  |  | 3 |
|  |  |  | 1024 |

Table 14 shown below discloses a case when the minimum granularity is equal to 5 MHz in the 40 MHz bandwidth.

TABLE 14

|  | Number of tones | Number of units | Total number of tones |
| --- | --- | --- | --- |
| RRU | 56 | 8 | 448 |
| IRU | 7 | 6 | 42 |
| left guard |  |  | 6 |
| right guard |  |  | 5 |
| DC |  |  | 11 |
|  |  |  | 512 |

Table 15 shown below discloses a case when the minimum granularity is equal to 5 MHz in the 20 MHz bandwidth.

TABLE 15

|  | Number of tones | Number of units | Total number of tones |
| --- | --- | --- | --- |
| RRU | 56 | 4 | 224 |
| IRU | 7 | 2 | 14 |

TABLE 15-continued

|  | Number of tones | Number of units | Total number of tones |
|---|---|---|---|
| left guard |  |  | 6 |
| right guard |  |  | 5 |
| DC |  |  | 7 |
|  |  |  | 256 |

Referring to Table 13 to Table 15, a unit of the basic resource allocation granularity and a RRU size may be identical.

More specifically, in a bandwidth of 80 MHz, the minimum granularity (or basic resource allocation granularity) may be equal to 10 MHz (114 tones), one RRU size may be equal to 114 tones, and one IRU size may be equal to 7 tones. At this point, 8 RRUs and 14 IRUs may be allocated to the bandwidth. A logical 2IRU may be used as the minimum allocation unit. Additionally, the number of left guard tones may be equal to 6, the number of right guard tones may be equal to 5, and the number of DC tones may be equal to 3.

Additionally, in a bandwidth of 40 MHz, the minimum granularity may be equal to 5 MHz (56 tones), one RRU size may be equal to 56 tones, and one IRU size may be equal to 7 tones. At this point, 8 RRUs and 6 IRUs may be allocated to the bandwidth. A logical 2IRU may be used as the minimum allocation unit. Additionally, the number of left guard tones may be equal to 6, the number of right guard tones may be equal to 5, and the number of DC tones may be equal to 11.

Additionally, in a bandwidth of 20 MHz, the minimum granularity may be equal to 5 MHz (56 tones), one RRU size may be equal to 56 tones, and one IRU size may be equal to 7 tones. At this point, 4 RRUs and 2 IRUs may be allocated to the bandwidth. A logical 2IRU may be used as the minimum allocation unit. Additionally, the number of left guard tones may be equal to 6, the number of right guard tones may be equal to 5, and the number of DC tones may be equal to 7.

The left side of FIG. 4 discloses RRU/IRU allocated to 80 MHz.

Referring to the left side of FIG. 4, left guard tone/RRU (114)/logical 2IRU(14)/RRU(114)/logical 2IRU(14)/RRU (114)/logical 2IRU(14)/RRU(114)/IRU(7)/DC/IRU(7)/ RRU(114)/logical 2IRU(14)/RRU(114)/logical 2IRU(14)/ RRU(114)/logical 2IRU(14)/RRU(114)/right guard tone may be allocated within the entire bandwidth.

The center of FIG. 4 discloses RRU/IRU allocated to 40 MHz.

Referring to the center of FIG. 4, left guard tone/RRU (56)/RRU(56)/logical 2IRU(14)/RRU(56)/RRU(56)/IRU (7)/DC/IRU(7)/RRU(56)/logical 2IRU(14)/RRU(56)/RRU (56)/RRU(56)/right guard tone may be allocated within the entire bandwidth.

The right side of FIG. 4 discloses RRU/IRU allocated to 20 MHz.

Referring to the right side of FIG. 4, left guard tone/RRU (56)/RRU(56)/IRU(7)/DC/IRU(7)/RRU(56)/RRU(56)/right guard tone may be allocated within the entire bandwidth.

In FIG. 4, the disclosed allocation positions of the RRUs and the allocation positions of the IRUs correspond to exemplary positions. Each of the IRUs may be diversely allocated to physically separated subcarriers (or tones) and may be used as one resource allocation unit.

Alternatively, according to the exemplary embodiment of the present invention, the minimum granularity in 80 MHz may be set to 5 MHz (56 tones), the minimum granularity in 40 MHz may be set to 2.5 MHz (26 tones), and the minimum granularity in 20 MHz may be set to 2.5 MHz (26 tones).

Table 16, Table 17, and Table 18 shown below respectively represent resource allocations of RRUs and a logical 2IRU unit corresponding to 80 MHz, 40 MHz, and 20 MHz. In Table 16 to Table 18 shown below, although the IRU being allocated to 14 tones may indicate the logical 2IRU, the IRU may also indicate one physical IRU.

TABLE 16

|  | Number of tones | Number of units | Total number of tones |
|---|---|---|---|
| RRU | 114 | 8 | 912 |
| IRU | 14 | 7 | 98 |
| left guard |  |  | 6 |
| right guard |  |  | 5 |
| DC |  |  | 3 |
|  |  |  | 1024 |

Referring to Table 16, 8 114-tone RRUs and 7 logical 2IRUs may be allocated to the 80 MHz bandwidth.

TABLE 17

|  | Number of tones | Number of units | Total number of tones |
|---|---|---|---|
| RRU | 56 | 8 | 448 |
| IRU | 14 | 3 | 42 |
| left guard |  |  | 6 |
| right guard |  |  | 5 |
| DC |  |  | 11 |
|  |  |  | 512 |

Referring to Table 17, 8 56-tone RRUs and 3 logical 2IRUs may be allocated to the 40 MHz bandwidth.

TABLE 18

|  | Number of tones | Number of units | Total number of tones |
|---|---|---|---|
| RRU | 26 | 8 | 208 |
| IRU | 14 | 2 | 28 |
| left guard |  |  | 6 |
| right guard |  |  | 5 |
| DC |  |  | 9 |
|  |  |  | 256 |

Referring to Table 18, 8 26-tone RRUs and 2 logical 2IRUs may be allocated to the 20 MHz bandwidth.

Table 19, Table 20, and Table 21 shown below represent combinations of other additional RRUs and IRUs within the 20 MHz bandwidth. In Table 19 ad Table 20 shown below, although the IRU being allocated to 14 tones may indicate the logical 2IRU, the IRU may also indicate one physical IRU.

TABLE 19

|  | Number of tones | Number of units | Total number of tones |
|---|---|---|---|
| RRU | 26 | 4 | 104 |
| IRU | 14 | 10 | 140 |

TABLE 19-continued

|  | Number of tones | Number of units | Total number of tones |
|---|---|---|---|
| left guard |  |  | 6 |
| right guard |  |  | 5 |
| DC |  |  | 1 |
|  |  |  | 256 |

TABLE 20

|  | Number of tones | Number of units | Total number of tones |
|---|---|---|---|
| RRU | 26 | 6 | 156 |
| IRU | 14 | 6 | 84 |
| left guard |  |  | 6 |
| right guard |  |  | 5 |
| DC |  |  | 5 |
|  |  |  | 256 |

TABLE 21

|  | Number of tones | Number of units | Total number of tones |
|---|---|---|---|
| RRU | 56 | 2 | 112 |
| IRU | 8 | 16 | 128 |
| left guard |  |  | 6 |
| right guard |  |  | 5 |
| DC |  |  | 5 |
|  |  |  | 256 |

Table 22 shown below discloses resource allocation within the 20 MHz bandwidth that is based on RRUs being allocated to 56 tones and IRUs being allocated to 13 tones. The logical 2IRU corresponding to 26 tones may be used as the minimum resource allocation unit.

TABLE 22

|  | Number of tones | Number of units | Total number of tones |
|---|---|---|---|
| RRU | 56 | 2 | 112 |
| IRU | 13 | 10 | 130 |
| left guard |  |  | 6 |
| right guard |  |  | 5 |
| DC |  |  | 3 |
|  |  |  | 256 |

Table 23 shown below discloses resource allocation within the 40 MHz bandwidth that is based on RRUs being allocated to 28 tones and IRUs being allocated to 13 tones. The logical 2IRU corresponding to 26 tones may be used as the minimum resource allocation unit.

TABLE 23

|  | Number of tones | Number of units | Total number of tones |
|---|---|---|---|
| RRU | 28 | 14 | 392 |
| IRU | 13 | 8 | 104 |

TABLE 23-continued

|  | Number of tones | Number of units | Total number of tones |
|---|---|---|---|
| left guard |  |  | 6 |
| right guard |  |  | 5 |
| DC |  |  | 5 |
|  |  |  | 512 |

Table 24 shown below discloses resource allocation within the 80 MHz bandwidth that is based on RRUs being allocated to 56 tones and IRUs being allocated to 13 tones. The logical 2IRU corresponding to 26 tones may be used as the minimum resource allocation unit.

TABLE 24

|  | Number of tones | Number of units | Total number of tones |
|---|---|---|---|
| RRU | 56 | 10 | 560 |
| IRU | 13 | 34 | 442 |
| left guard |  |  | 6 |
| right guard |  |  | 5 |
| DC |  |  | 11 |
|  |  |  | 1024 |

Table 25 shown below discloses resource allocation within the 80 MHz bandwidth that is based on RRUs being allocated to 57 tones and IRUs being allocated to 26 tones.

TABLE 25

|  | Number of tones | Number of units | Total number of tones |
|---|---|---|---|
| RRU | 57 | 14 | 798 |
| IRU | 26 | 8 | 208 |
| left guard |  |  | 6 |
| right guard |  |  | 5 |
| DC |  |  | 7 |
|  |  |  | 1024 |

Additionally, according to the exemplary embodiment of the present invention, each of the RRUs and the IRUs may be respectively allocated as shown below in each of 20 MHz, 40 MHz, and 80 MHz. {RRU, IRU}={56 tones, 7 tones} may be allocated for the 20 MHz bandwidth, {RRU, IRU}={56 tones, 7 tones} (or ={114 tones, 7 tones} may be allocated for the 40 MHz bandwidth, and {RRU, IRU}={114 tones, 7 tones} may be allocated for the 80 MHz bandwidth.

Figure 5:
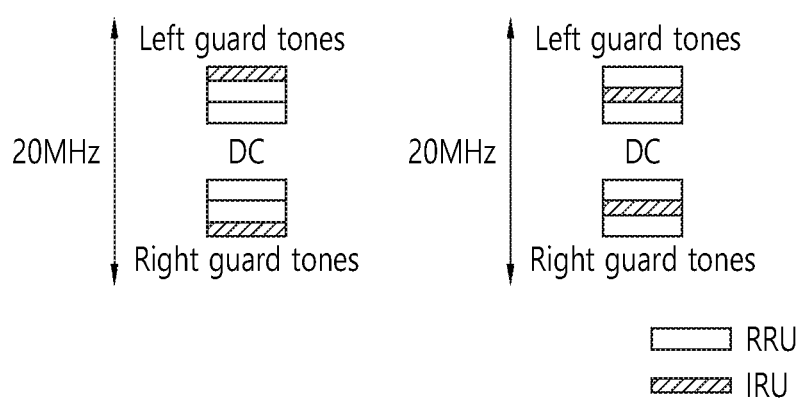
FIG. 5 is a conceptual view illustrating a resource allocation according to an exemplary embodiment of the present invention.

FIG. 5 is a conceptual view illustrating a resource allocation according to an exemplary embodiment of the present invention.

FIG. 5 discloses a resource allocation of {RRU, IRU}={56 tones, 7 tones} for the 20 MHz bandwidth, which is shown below in Table 26.

TABLE 26

|  | Number of tones | Number of units | Total number of tones |
|---|---|---|---|
| RRU | 56 | 4 | 224 |
| IRU | 7 | 2 | 14 |

TABLE 26-continued

| | Number of tones | Number of units | Total number of tones |
|---|---|---|---|
| left guard | | | 6 |
| right guard | | | 5 |
| DC | | | 7 |
| | | | 256 |

Referring to the left side of FIG. 5, left guard tone/IRU (7)/RRU(56)/RRU(56)/DC tone/RRU(56)/RRU(56)/IRU (7)/right guard tone may be allocated within the 20 MHz bandwidth.

Referring to the right side of FIG. 5, left guard tone/RRU (56)/IRU(7)/RRU(56)/DC tone/RRU(56)/RRU(7)/RRU (56)/right guard tone may be allocated within the 20 MHz bandwidth.

The above-described allocation of the RRUs and the IRUs may vary in accordance with the number of users (or STAs). In the following description, in case the number of users is equal to 1, 2, 3, 4, and 5, examples of allocating resources to each number of users will be disclosed. The allocation order may be varied, and it will be essentially assumed that all resources are allocated to the user(s) within the entire bandwidth.

One (1) user (In case the number of allocation is equal to 1): the numerology of 256 FFT (242 tones) that is used in the legacy 80 MHz bandwidth may be applied and used in 20 MHz. 8 pilot tones may be included. More specifically, 242 tones may be allocated for one user.

Two (2) users (In case the number of allocation is equal to 2): 4 RRUs (2RRU+2RRU) may be allocated to user1, and 2 IRUs (2IRU) may be allocated to user2. The 4 RRUs may have a structure of 2 2RRUs each being configured of 2 RRUs. A 2RRU may be allocated to 112 tones, wherein the 112 tones include 108 data tones and 4 pilot tones. A 2IRU may be allocated to 14 tones, wherein the 14 tones include 12 data tones and 2 pilot tones. In case the entire bandwidth is allocated to two users, in order to transmit data to user1, 2-block data interleaving using a legacy interleaver having the size of 108 may be performed.

Three (3) users (In case the number of allocation is equal to 3): a 2RRU may be allocated to user1, another 2RRU may be allocated to user2, and a 2IRU may be allocated to user3. A 2RRU may be allocated to 112 tones, wherein the 112 tones include 108 data tones and 4 pilot tones. A 2IRU may be allocated to 14 tones, wherein the 14 tones include 12 data tones and 2 pilot tones. In order to transmit data to each of user1 and user2, block data interleaving using a legacy interleaver having the size of 108 may be performed.

Four (4) users (In case the number of allocation is equal to 4): a RRU may be allocated to user1, another RRU may be allocated to user2, a 2RRU may be allocated to user3, and a 2IRU may be allocated to user4. A 2RRU may be allocated to 112 tones, wherein the 112 tones include 108 data tones and 4 pilot tones. A RRU may be allocated to 56 tones, wherein the 56 tones include 52 data tones and 4 pilot tones. A 2IRU may be allocated to 14 tones, wherein the 14 tones include 12 data tones and 2 pilot tones. In order to transmit data to each of user1 and user2, block data interleaving using a legacy interleaver having the size of 52 may be performed, and, in order to transmit data to user3, block data interleaving using a legacy interleaver having the size of 108 may be performed.

Five (5) users (In case the number of allocation is equal to 5): a RRU may be allocated to user1, a RRU may be allocated to user2, a RRU may be allocated to user3, a RRU may be allocated to user4, and a 2IRU may be allocated to user5. A RRU may be allocated to 56 tones, wherein the 56 tones include 52 data tones and 4 pilot tones. A 2IRU may be allocated to 14 tones, wherein the 14 tones include 12 data tones and 2 pilot tones. In order to transmit data to each of user1 to user4, block data interleaving using a legacy interleaver having the size of 52 may be performed.

More specifically, in case the number of users is equal to 1-5, the legacy interleaver (data interleaver) may be used for each user.

The above-described allocation of RRU/IRU in accordance with the number of users within the 20 MHz bandwidth is merely exemplary, and, therefore, the RRU/IRU may be allocated by using diverse methods, and such exemplary embodiments are also included in the scope of the present invention.

Figure 6:
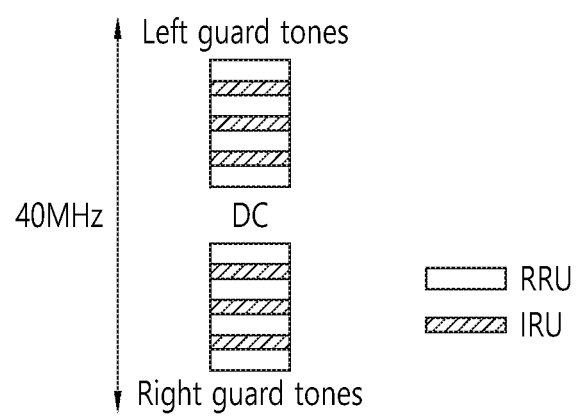
FIG. 6 is a conceptual view illustrating a resource allocation according to an exemplary embodiment of the present invention.

FIG. 6 is a conceptual view illustrating a resource allocation according to an exemplary embodiment of the present invention.

FIG. 6 discloses a resource allocation of {RRU, IRU}={56 tones, 7 tones} for the 40 MHz bandwidth, which is shown below in Table 27.

TABLE 27

| | Number of tones | Number of units | Total number of tones |
|---|---|---|---|
| RRU | 56 | 8 | 448 |
| IRU | 7 | 6 | 42 |
| left guard | | | 6 |
| right guard | | | 5 |
| DC | | | 11 |
| | | | 512 |

Referring to FIG. 6, left guard tone/RRU(56)/IRU(7)/ RRU(56)/IRU(7)/RRU(56)/IRU(7)/RRU(56)/DC tone/RRU (56)/IRU(7)/RRU(56)/IRU(7)/RRU(56)/IRU(7)/RRU(56)/ right guard tone may be allocated within the 40 MHz bandwidth.

The above-described allocation of the RRUs and the IRUs may vary in accordance with the number of users. In the following description, in case the number of users is equal to 1, 2, 3, 4, and 5, examples of allocating resources to each number of users will be disclosed. The allocation order may be varied, and it will be essentially assumed that all resources are allocated to the user(s) within the entire bandwidth.

One (1) user: the numerology of 256 FFT (242 tones) that is used in the legacy 80 MHz bandwidth may be applied and used in 40 MHz. 8 pilot tones may be included. Alternatively, 490 tones configured of a combination of 8 RRUs (8RRU)+6 IRUs (6IRU) may be allocated to the user.

Two (2) users: 8 RRUs (8RRU) may be allocated to user1, and 6 IRUs (6IRU) may be allocated to user2. Each RRU may be allocated to 56 tones, wherein the 56 tones include 52 data tones and 4 pilot tones. Therefore, a 8RRU may be allocated to 416(52*8) tones as the data tones and may be allocated to 32(4*8) tones as the pilot tones. Accordingly, each IRU may be allocated to 7 tones, wherein the 7 tones include 6 data tones and 1 pilot tone. Therefore, a 6IRU may be allocated to 36(6*6) tones as the data tones and may be allocated to 6(1*6) tones as the pilot tones.

Three (3) users: a 4RRU may be allocated to user1, a 4RRU may be allocated to user2, and a 6IRU may be allocated to user3. Alternatively, a 6RRU may be allocated to user1, a 2RRU may be allocated to user2, and a 6IRU may be allocated to user3. Each RRU may be allocated to 56 tones, wherein the 56 tones include 52 data tones and 4 pilot tones. Each IRU may be allocated to 7 tones, wherein the 7 tones include 6 data tones and 1 pilot tone. Alternatively, the IRU may be segmented to smaller segments and then be allocated to each user.

Four (4) users-seven(7) users: since the RRU size is equal to 56 tones, this structure may easily support the legacy interleaver size. Therefore, the RRUs and the IRUs may be allocated to each of the plurality of users by using diverse combinations.

The above-described allocation of RRU/IRU in accordance with the number of users within the 40 MHz bandwidth is merely exemplary, and, therefore, the RRU/IRU may be allocated by using diverse methods, and such exemplary embodiments are also included in the scope of the present invention.

Figure 7:
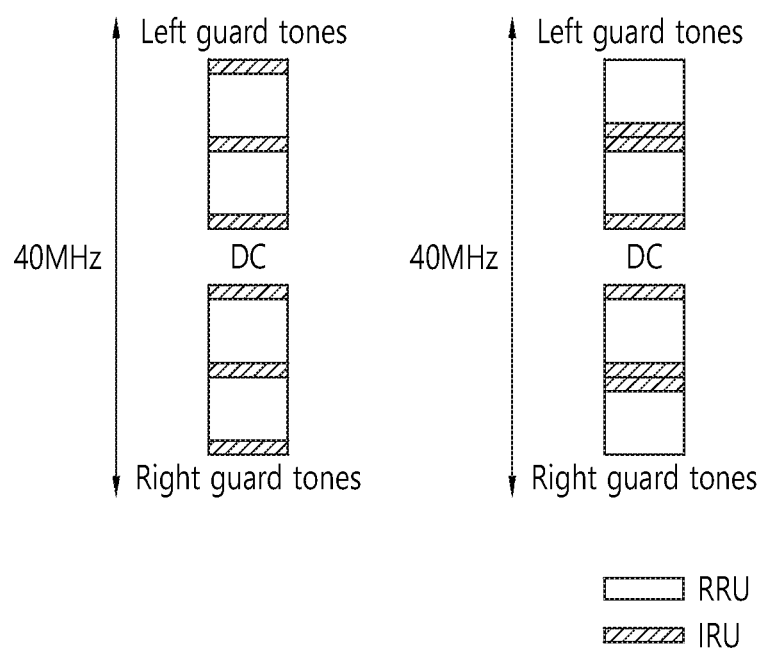
FIG. 7 is a conceptual view illustrating a resource allocation according to an exemplary embodiment of the present invention.

FIG. 7 is a conceptual view illustrating a resource allocation according to an exemplary embodiment of the present invention.

FIG. 7 discloses a resource allocation of {RRU, IRU}={114 tones, 7 tones} for the 40 MHz bandwidth, which is shown below in Table 28.

TABLE 28

|  | Number of tones | Number of units | Total number of tones |
| --- | --- | --- | --- |
| RRU | 114 | 4 | 456 |
| IRU | 7 | 6 | 42 |
| left guard |  |  | 6 |
| right guard |  |  | 5 |
| DC |  |  | 3 |
|  |  |  | 512 |

Referring to the left side of FIG. 7, left guard tone/IRU(7)/RRU(114)/IRU(7)/RRU(114)/IRU(7)/DC tone/IRU(7)/RRU(114)/IRU(7)/RRU(114)/IRU(7)/right guard tone may be allocated within the 40 MHz bandwidth.

Referring to the right side of FIG. 7, left guard tone/RRU(114)/IRU(7)/IRU(7)/RRU(114)/IRU(7)/DC tone/IRU(7)/RRU(114)/IRU(7)/IRU(7)/RRU(114)/right guard tone may be allocated within the 40 MHz bandwidth.

The above-described allocation of the RRUs and the IRUs may vary in accordance with the number of users. In the following description, in case the number of users is equal to 1, 2, 3, 4, and 5, examples of allocating resources to each number of users will be disclosed. The allocation order may be varied, and it will be essentially assumed that all resources are allocated to the user(s) within the entire bandwidth.

One (1) user: the numerology of 256 FFT (242 tones) that is used in the legacy 80 MHz bandwidth may be applied and used in 40 MHz. 8 pilot tones may be included. Alternatively, 484 tones configured of a combination of 4 RRUs (4RRU)+4 IRUs (4IRU) may be allocated to the user.

Two (2) users: 4 RRUs (4RRU) may be allocated to user1, and 6 IRUs (6IRU) may be allocated to user2. Each RRU may be allocated to 114 tones, wherein the 114 tones include 108 data tones and 6 pilot tones. Therefore, a 4RRU may be allocated to 432(108*4) tones as the data tones and may be allocated to 24(6*4) tones as the pilot tones. Each IRU may be allocated to 7 tones, wherein the 7 tones include 6 data tones and 1 pilot tone. Therefore, a 6IRU may be allocated to 36(6*6) tones as the data tones and may be allocated to 6(1*6) tones as the pilot tones.

Three (3) users: a RRU may be allocated to user1, a 3RRU may be allocated to user2, and a 6IRU may be allocated to user3. Alternatively, a 2RRU may be allocated to user1, a 2RRU may be allocated to user2, and a 6IRU may be allocated to user3. Each RRU may be allocated to 114 tones, wherein the 114 tones include 108 data tones and 6 pilot tones. Each IRU may be allocated to 7 tones, wherein the 7 tones include 6 data tones and 1 pilot tone. Alternatively, the IRU may be segmented to smaller segments and then be allocated to each user.

Four (4) users-seven (7) users: since the RRU size is equal to 114 tones, this structure may easily support the legacy interleaver size. Therefore, the RRUs and the IRUs may be allocated to each of the plurality of users by using diverse combinations.

The above-described allocation of RRU/IRU in accordance with the number of users within the 40 MHz bandwidth is merely exemplary, and, therefore, the RRU/IRU may be allocated by using diverse methods, and such exemplary embodiments are also included in the scope of the present invention.

Figure 8:
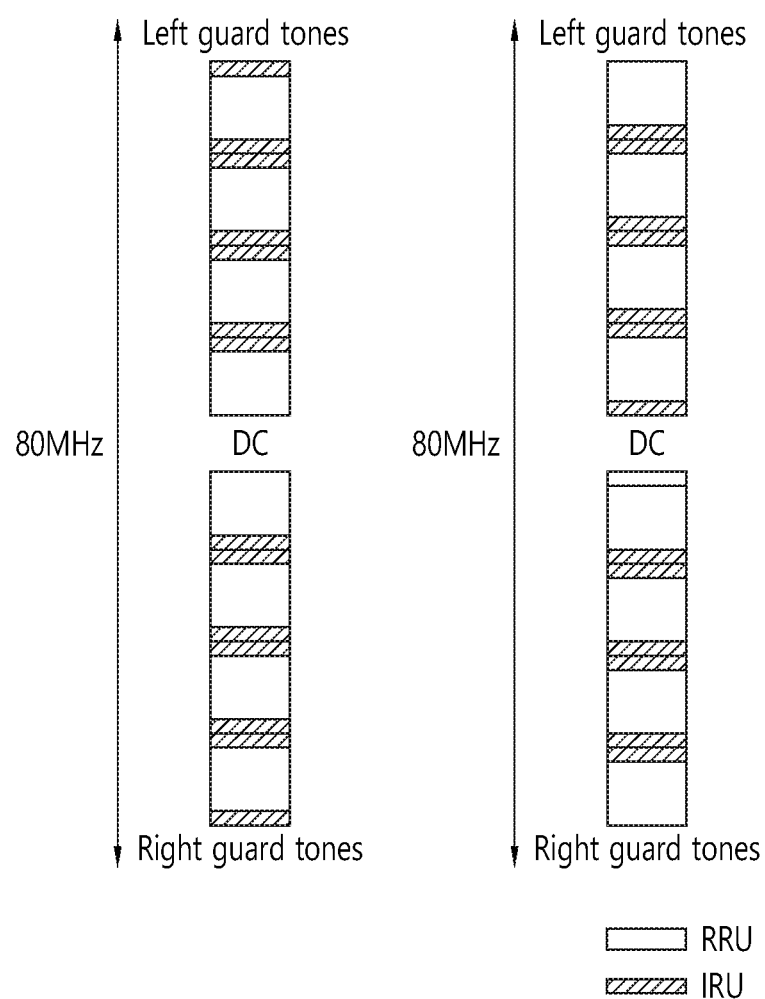
FIG. 8 is a conceptual view illustrating a resource allocation according to an exemplary embodiment of the present invention.

FIG. 8 is a conceptual view illustrating a resource allocation according to an exemplary embodiment of the present invention.

FIG. 8 discloses a resource allocation of {RRU, IRU}={114 tones, 7 tones} for the 80 MHz bandwidth, which is shown below in Table 29.

TABLE 29

|  | Number of tones | Number of units | Total number of tones |
| --- | --- | --- | --- |
| RRU | 114 | 8 | 912 |
| IRU | 7 | 14 | 98 |
| left guard |  |  | 6 |
| right guard |  |  | 5 |
| DC |  |  | 3 |
|  |  |  | 1024 |

Referring to the left side of FIG. 8, left guard tone/IRU(7)/RRU(114)/IRU(7)/IRU(7)/RRU(114)/IRU(7)/IRU(7)/RRU(114)/IRU(7)/IRU(7)/RRU(114)/DC tone/RRU(114)/IRU(7)/IRU(7)/RRU(114)/IRU(7)/IRU(7)/RRU(114)/IRU(7)/IRU(7)/RRU(114)/IRU(7)/right guard tone may be allocated within the 80 MHz bandwidth.

Referring to the right side of FIG. 8, left guard tone/RRU(114)/IRU(7)/IRU(7)/RRU(114)/IRU(7)/IRU(7)/RRU(114)/IRU(7)/IRU(7)/RRU(114)/IRU(7)/DC tone/IRU(7)/RRU(114)/IRU(7)/IRU(7)/RRU(114)/IRU(7)/IRU(7)/RRU(114)/IRU(7)/IRU(7)/RRU(114)/right guard tone may be allocated within the 80 MHz bandwidth.

The above-described allocation of the RRUs and the IRUs may vary in accordance with the number of users. In the following description, in case the number of users is equal to 1, 2, 3, 4, and 5, examples of allocating resources to each number of users will be disclosed. The allocation order may be varied, and it will be essentially assumed that all resources are allocated to the user(s) within the entire bandwidth.

The allocation method according to the number of allocations being allocated to users (or number of users) within the 80 MHz bandwidth may be similar to the cases when the bandwidth corresponds to 20 MHz and 40 MHz. Essentially, resource allocation to a user may be performed by using a method of using the related art 108-size interleaver for the interleaving of 108 data tone (or data subcarrier) units.

One (1) user: the numerology of 256 FFT (242 tones) that is used in the legacy 80 MHz bandwidth may be applied and used in 80 MHz. 8 pilot tones may be included. Alternatively, 1010 tones configured of a combination of 8 RRUs (8RRU)+14 IRUs (14IRU) may be allocated to the user.

Two (2) users: 8 RRUs (8RRU) may be allocated to user1, and 14 IRUs (14IRU) may be allocated to user2. Each RRU may be allocated to 114 tones, wherein the 114 tones include 108 data tones and 6 pilot tones. Therefore, a 8RRU may be allocated to 864(108*8) tones as the data tones and may be allocated to 48(6*8) tones as the pilot tones. Each IRU may be allocated to 7 tones, wherein the 7 tones include 6 data tones and 1 pilot tone. Therefore, a 14IRU may be allocated to 84(6*14) tones as the data tones and may be allocated to 14(1*14) tones as the pilot tones.

Three (3) users: a 4RRU may be allocated to user1, a 4RRU may be allocated to user2, and a 14IRU may be allocated to user3. Each RRU may be allocated to 114 tones, wherein the 114 tones include 108 data tones and 6 pilot tones. Each IRU may be allocated to 7 tones, wherein the 7 tones include 6 data tones and 1 pilot tone. Alternatively, the IRU may be segmented to smaller segments and then be allocated to each user.

Four (4) users-seven (7) users: since the RRU size is equal to 114 tones, this structure may easily support the legacy interleaver size. Therefore, the RRUs and the IRUs may be allocated to each of the plurality of users by using diverse combinations.

The above-described allocation of RRU/IRU in accordance with the number of users within the 80 MHz bandwidth is merely exemplary, and, therefore, the RRU/IRU may be allocated by using diverse methods, and such exemplary embodiments are also included in the scope of the present invention.

Hereinafter, a method for signaling information corresponding to the resource allocation based on RRU/IRU will be disclosed in the exemplary embodiments of the present invention.

Figure 9:
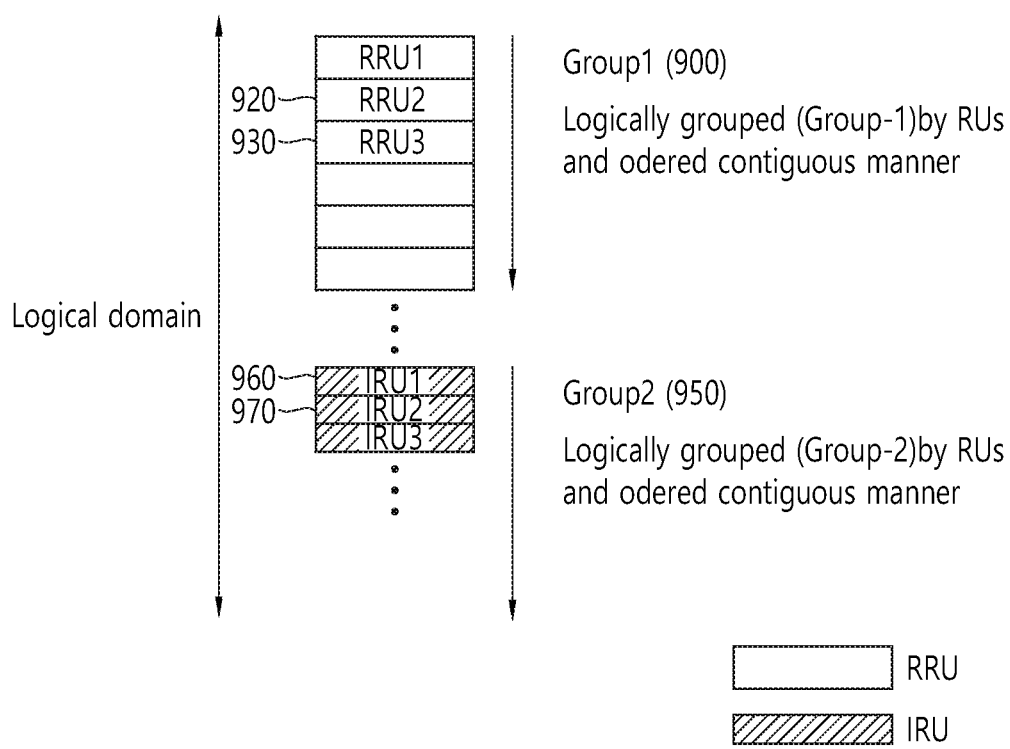
FIG. 9 is a conceptual view illustrating a method for signaling information corresponding to RRU/IRU based resource allocation according to an exemplary embodiment of the present invention.

FIG. 9 is a conceptual view illustrating a method for signaling information corresponding to RRU/IRU based resource allocation according to an exemplary embodiment of the present invention.

FIG. 9 discloses a method for singling information corresponding to RRUs/IRUs that are allocated for the downlink transmission to the user and/or the uplink transmission of the user.

Referring to FIG. 9, in order to effectively perform signaling of the information corresponding to two different resource units (e.g., RRU, IRU), first of all, the same type of RUs may be grouped and aligned (or ordering of the same type of RUs may be performed) within a logical domain.

According to the exemplary embodiment of the present invention, a structure wherein group1 900, which corresponds to a group of RRUs having a relatively larger size within the logical domain, has a higher priority, and wherein group1 900 is followed by group2 950, which corresponds to a group of IRUs having a relatively smaller size, may be configured. Within a group, alignment (or ordering) may be performed in accordance with the allocated subbands or in accordance with the allocated indexes. The allocation order within the logical domain may be varied in accordance with the system environment and the supported traffic situation.

A bitmap signaling the resource allocation information (hereinafter referred to as a resource allocation signaling bitmap) may include indicator1 for group1 900 and indicator2 for group2 950. Indicator1 and indicator2 may be included in the resource allocation signaling bitmap by being divided into separate bitmaps.

For example, in case a specific STA is allocated with RRU2 920 and RRU3 930, '01100 . . . ' may be used for the resource allocation as indicator1 for group1 900. Additionally, when a specific STA is allocated with IRU1 960 and IRU2 970, '1100 . . . ' may be used for the resource allocation as indicator2 for group2 950.

The signaling for each of group1 900 and group2 950 may be transmitted through a resource allocation signaling bitmap, which is configured to have a single structure. In this case, the resource allocation signaling bitmap may be interpreted based on boundary information corresponding to the bits for group1 900 and the bits for group2 950 within a single resource allocation signaling bitmap.

For example, in case the ordering of the RRU is performed firsthand, information on the number of RRUs and information on the end position of each RRU may be transmitted through a signaling field in advance, as resource allocation signaling bitmap interpretation information, before transmitting the resource allocation signaling bitmap.

Most particularly, for example, in case a resource allocation signaling bitmap including the resource allocation information is transmitted from a second signaling field (e.g., high efficiency (HE)-signal (SIG)2 field) that is included in a PPDU header of a physical protocol data unit (PPDU), the above-described resource allocation signaling bitmap interpretation information may be transmitted from a first signal field (e.g., HE-SIG1 field), which is transmitted before the second signal field.

In case the resource allocation signaling bitmap interpretation information is transmitted from the first signal field, decoding complexity of the resource allocation signaling bitmap, which is transmitted through the second signal field, may be reduced. Alternatively, the resource allocation signaling bitmap interpretation information and the resource allocation signaling bitmap may both be transmitted to the second signal field, and, when performing information parsing, the resource allocation signaling bitmap interpretation information may first be decoded in the second signal field, and, afterwards, the resource allocation signaling bitmap may be decoded based on the decoded bitmap interpretation information.

In case the resource allocation signaling bitmap is used, a problem may occur due to an overhead caused by the bitmap. Therefore, according to the exemplary embodiment of the present invention, in order to reduce the overhead, the number of RUs may be indicated based on an indexing method. For example, in case 4 RRUs and 2 IRUs are allocated within the entire bandwidth, the allocation for the 4 RRUs may be indicated by using the indexing method. For example, the 4 RRUs may be expressed as 11 in case the bits for indexing the number of RUs is equal to 2 bits (00 in case the number of bits is equal to 0), 011 in case the bits for indexing the number of RUs is equal to 3 bits, and 0011 in case the bits for indexing the number of RUs is equal to 4 bits (the bits may be supported as a single structure up to the bandwidth of 80 MHz).

Additionally, according to the exemplary embodiment of the present invention, the resource allocation information that is allocated to the user may also indicated based on offset information and length information. For example, in case RRU2 and RRU3 are allocated for an STA, the resource allocation information may be signaled to the STA based on the information on a start offset(=1) and the information on the length(=2). The STA may acquire information on the RRUs that are allocated for the STA based on the information on the start offset and the information on the length.

If the entire bandwidth is equal to 20 MHz, the information on the start offset may be equal to 2 bits, and the information on the length may be equal to 2 bits. In the example presented above, wherein the start offset is equal to 1 and the length is equal to 2, the information on the start offset may be expressed as a bit value of '01', and the information on the length may be expressed as a bit value of '10'.

included in a RRU may vary in accordance with the number of allocated RRUs. More specifically, the number of data tones and the number of pilot tones within a RRU may vary in accordance with the number of RRUs being allocated to the user.

In case RRUs based on 56 tones and IRUs based on 8 tones are used, the number of data tones and the number of pilot tones being allocated to one RRU may vary in accordance with the number of RRUs being allocated to the user within a bandwidth of 20 MHz as shown below in Table 30.

TABLE 30

| Number of allocated RRUs | Number of data tones per RRU | Number of pilot tones per RRU | Interleaver size |
|---|---|---|---|
| 1 | 52 | 4 | 52 (data interleaver size used in the legacy 20 MHz 64 FFT) |
| 2 | 54 (total 108 tones for 2RRUs) | 2 (total 4 tones for 2RRUs) | 108 (data interleaver size used in the legacy 40 MHz 128 FFT) |
| 3 | 52 for one block (1 RRU), 54 for the other block (2 RRUs) | 16 (DC: 5, GS: 11 or DC: 3, GS: 13) 4 for 1RRU, 2 for each of 2RRUs (total 8 tones for 3RRUs) | Two block interleaving (1RRU + 2RRUs): application of data interleaver size of 52 for 1RRU, application of data interleaver size of 108 for 2RRUs |
| 4 (option-1) | 54 (total 216 tones for 4RRUs) | 2 (total 8 tones for 4RRUs) | Two block interleaving (2RRUs + 2RRUs): application of data interleaver size of 108 for each block |
| 4 (option-2) | Entire BW allocation (re-usage of numerology used in the legacy 80 MHz 256 FFT) | Entire BW allocation (re-usage of pilot used in the legacy 80 MHz 256 FFT) | 234 (application of data interleaver used in the legacy 80 MHz 256 FFT) |

Considering the case when the entire bandwidth is extended to up to 80 MHz, the information on the start offset may be equal to 4 bits, and the information on the length may be equal to 4 bits. In the example presented above, wherein the start offset is equal to 1 and the length is equal to 2, the information on the start offset may be expressed as a bit value of '0001', and the information on the length may be expressed as a bit value of '0010'. Similarly, the signaling of the IRUs may also be performed based on the information on the start offset and the information on the length.

Resource allocation of RRU1, which is allocated to 56 tones (or subcarriers), and RRU2, which is allocated to 26 tones (or subcarriers), may be supported by differently setting up the minimum granularity in accordance with the size of the bandwidth.

More specifically, although a gain of full scalability can be acquired independently from the size of the bandwidth, by setting the minimum granularity to be subordinate to the size of the bandwidth, the signaling overhead may be reduced. For example, the minimum granularity corresponding to each of 20 MHz, 40 MHz, and 80 MHz may respectively be equal to RRUs of 26 tones, RRUs of 56 tones, and RRUs of 56 tones. Moreover, in another example, the minimum granularity corresponding to each of 20 MHz, 40 MHz, and 80 MHz may respectively be equal to RRUs of 26 tones, RRUs of 26 tones, and RRUs of 56 tones.

Hereinafter, the exemplary embodiment of the present invention discloses RRUs and IRUs configuring the data tone and an interleaver size for interleaving the data tones and the pilot tones. According to the exemplary embodiment of the present invention, the number of pilot tones being In case the RU size is equal to 56 tones (or in case of a RRU structure based on 56 subcarriers), the data tones and the pilot tones may be allocated as described above. Essentially, in order to use the interleaver size (108, 52, etc.) that was used in the legacy wireless LAN system, data tones and pilot tones may be allocated within at least one of the allocated RRUs. For reference, in the legacy wireless LAN, 64FFT was used for the bandwidth of 20 MHz, and interleaving of data tones based on the interleaver size of 108 was performed. Additionally, in the legacy wireless LAN, 128FFT was used for the bandwidth of 40 MHz, and interleaving of data tones based on the interleaver having the size of 108 was performed.

More specifically, in case the number of RRUs being allocated to the STA is equal to 1, among the 56 tones allocated to the RRU, 52 tones may be used as the data tones, and the remaining 4 tones may be used as the pilot tones. In case such allocation of data tones and pilot tones is used, the interleaving for 52 data tones may be performed based on the interleaver having the size of 52.

Additionally, in case the number of RRUs being allocated to the STA is equal to 2, among the 56 tones allocated to the RRU, 54 tones may be used as the data tones, and the remaining 2 tones may be used as the pilot tones. More specifically, the 2RRU may be allocated to 108 data tones and 4 pilot tones. In case such allocation of data tones and pilot tones is used, the interleaving for 108 data tones may be performed based on the interleaver having the size of 108.

Additionally, in case the number of RRUs being allocated to the STA is equal to 3, RRU1, wherein, among the allocated 56 tones, 52 tones may be used as the data tones, and the remaining 4 tones may be used as the pilot tones, and RRU2, wherein, among the allocated 56 tones, 54 tones may be used as the data tones, and the remaining 2 tones may be used as the pilot tones, may be used. More specifically, among the 3 RRUs, one RRU may correspond to RRU1 (52 data tones and 4 pilot tones) and the remaining two RRUs may correspond to RRU2 (54 data tones and 2 pilot tones).

More specifically, 3RRU may be allocated to 160 data tones (108 data tones+52 data tones) and 8 pilot tones. In case such data tone and pilot tone allocation is used, a two-block interleaving may be performed. More specifically, interleaving for 108 data tones based on an interleaver having the size of 108 and interleaving for 52 data tones based on an interleaver having the size of 52 may be performed.

Additionally, in case the number of RRUs being allocated to the STA is equal to 4, among the 56 tones allocated to each RRU, 54 tones may be used as the data tones, and the remaining 2 tones may be used as the pilot tones. More specifically, the 4RRU may be allocated to 216 data tones (108 data tones+108 data tones) and 8 pilot tones. In case such data tone and pilot tone allocation is used, a two-block interleaving may be performed. In case such allocation of data tones and pilot tones is used, the interleaving for 108 data tones may be performed based on the interleaver having the size of 108. More specifically, interleaving for a first set of 108 data tones based on an interleaver having the size of 108 and interleaving for a second set of 108 data tones based on an interleaver having the size of 108 may be performed.

Alternatively, in case the number of RRUs being allocated to the STA is equal to 4, 256 IFFT/FFT corresponding to the legacy 80 MHz bandwidth may be used. More specifically, 234 data tones and 8 pilot tones may be used, and the interleaver that was used for the 256 IFFT/FFT corresponding to the legacy 80 MHz bandwidth may perform interleaving for 234 data tones.

Based on the above-described allocation of data tones and pilot tones in accordance with the number of allocated RRUs within the bandwidth of 20 MHz, the allocation of data tones and pilot tones in accordance with the number of allocated RRUs within the bandwidths of 40 MHz and 80 MHz may be performed.

According to the exemplary embodiment of the present invention, the allocated number of data tones and the allocated number of pilot tones in accordance with the allocated RRUs within the bandwidth of 40 MHz may be determined based on the allocation of data tones and pilot tones in accordance with the number of RRU allocations within the bandwidth of 20 MHz, as described above in Table 30.

First of all, in case the number of RRU allocations within the bandwidth of 40 MHz is equal to 1 to 4, the data tones and the pilot tones may be allocated by using the same method as the method used in the case when the number of RRU allocations within the bandwidth of 20 MHz is equal to 1 to 4.

In case the number of RRU allocations within the bandwidth of 40 MHz is equal to 5 to 7, the allocation method of data tones and pilot tones corresponding to the case when the number of RRU allocations within the bandwidth of 20 MHz is equal to 1 to 4 may be used.

For example, in case the number of RRUs allocated within the bandwidth of 40 MHz is equal to 5, the above-described allocation of data tones and pilot tones (option 1 or option 2) corresponding to 4 RRUs within the bandwidth of 20 MHz may be applied to the 4 RRUs, and the above-described allocation of data tones and pilot tones corresponding to one RRU within the bandwidth of 20 MHz may be applied to the one RRU.

Additionally, in case the number of RRUs allocated within the bandwidth of 40 MHz is equal to 6, the above-described allocation of data tones and pilot tones (option 1 or option 2) corresponding to 4 RRUs within the bandwidth of 20 MHz may be applied to the 4 RRUs, and the above-described allocation of data tones and pilot tones corresponding to 2 RRUs within the bandwidth of 20 MHz may be applied to the remaining 2 RRUs.

Additionally, in case the number of RRUs allocated within the bandwidth of 40 MHz is equal to 7, the above-described allocation of data tones and pilot tones (option 1 or option 2) corresponding to 4 RRUs within the bandwidth of 20 MHz may be applied to the 4 RRUs, and the above-described allocation of data tones and pilot tones corresponding to 3 RRUs within the bandwidth of 20 MHz may be applied to the remaining 3 RRUs.

Additionally, in case the number of RRUs allocated within the bandwidth of 40 MHz is equal to 8, the above-described allocation of data tones and pilot tones (option 1 or option 2) corresponding to 4 RRUs within the bandwidth of 20 MHz may be repeated and applied to the 8 RRUs.

Additionally, according to the exemplary embodiment of the present invention, for the data tones and the pilot tones according to the number of RRU allocations within the bandwidth of 80 MHz, the data tones and the pilot tones according to the above-described number of RRU allocations within the bandwidth of 40 MHz may be repeated and applied.

First of all, in case the number of RRU allocations within the bandwidth of 80 MHz is equal to 1 to 8, the data tones and the pilot tones may be allocated by using the same method as the method used in the case when the number of RRU allocations within the bandwidth of 40 MHz is equal to 1 to 8.

In case the number of RRU allocations within the bandwidth of 80 MHz is equal to 9 to 15, the above-described allocation of data tones and pilot tones corresponding to 8 RRUs within the bandwidth of 40 MHz may be applied to the 8 RRUs, and the above-described allocation of data tones and pilot tones corresponding to 1 to 7 RRUs within the bandwidth of 40 MHz may be applied to the remaining RRUs.

Additionally, in case the number of RRUs allocated within the bandwidth of 80 MHz is equal to 16, the above-described allocation of data tones and pilot tones corresponding to 8 RRUs within the bandwidth of 40 MHz may be repeated and applied to the 16 RRUs.

In case RRUs based on 26 tones and IRUs based on 8 tones are used, the number of data tones and the number of pilot tones being allocated to one RRU may vary in accordance with the number of RRUs being allocated to the user within a bandwidth of 20 MHz as shown below in Table 31.

TABLE 31

| Number of allocated RRUs | Number of data tones per RRU | Number of pilot tones per RRU | Interleaver size |
| --- | --- | --- | --- |
| 1 | 24 | 2 | 24 (data interleaver size used in the legacy 802.11ah 1 MHz 34 FFT) |
| 2 | 24 (total 48 tones for 2RUs) | 2 (total 4 tones for 2RUs) | Two block interleaving (1RU + 1RU): each block uses of data interleaver having the size of 24 |
| 3 | 24 (total 72 tones for 3RUs) | 2 (total 6 tones for 3RUs) | Three block interleaving (1RU + 1RU + 1RU): each block uses of data interleaver having the size of 24 |
| 4 | 24 (total 96 tones for 4RUs) | 2 (total 8 tones for 4RUs) | Four block interleaving (1RU + 1RU + 1RU + 1RU): each block uses of data interleaver having the size of 24 |
| . . . | | | |
| . . . | | | |
| . . . | | | |
| 8 (option-1) | 24 (total 192 tones for 8RUs) | 2 (total 16 tones for 8RUs) | Eight block interleaving (1RU + 1RU + 1RU + 1RU . . . + 1RU): each block uses of data interleaver having the size of 24 |
| 8 (option-2) | Entire BW allocation (re-usage of numerology used in the legacy 80 MHz 256 FFT) | Entire BW allocation (re-usage of pilot used in the legacy 80 MHz 256 FFT) | 234 (data interleaver used in the legacy 80 MHz 256 FFT) |

In case the RU size is equal to 24 tones (or in case of a RRU structure based on 24 subcarriers), the data tones and the pilot tones may be allocated as described above. Essentially, in order to use the interleaver size (108, 52, 24, etc.) that was used in the legacy wireless LAN system, data tones and pilot tones may be allocated within at least one of the allocated RRUs.

More specifically, in case the number of RRUs being allocated to the STA is equal to 1, among the 26 tones allocated to the RRU, 24 tones may be used as the data tones, and the remaining 2 tones may be used as the pilot tones. In case such allocation of data tones and pilot tones is used, the interleaving for 24 data tones may be performed based on the interleaver having the size of 24.

Additionally, in case the number of RRUs being allocated to the STA is equal to 2, among the 26 tones allocated to the RRU, 24 tones may be used as the data tones, and the remaining 2 tones may be used as the pilot tones. More specifically, 2 RRUs (2RRU) may be allocated to 48 data tones and 4 pilot tones. In case such allocation of data tones and pilot tones is used, two-block interleaving that is based on the interleaver having the size of 24 may be performed for the 24 data tones included in each 2RRU.

Additionally, in case the number of RRUs being allocated to the STA is equal to 3, among the 26 tones allocated to each RRU, 24 tones may be used as the data tones, and the remaining 2 tones may be used as the pilot tones. More specifically, 3 RRUs (3RRU) may be allocated to 72 data tones and 6 pilot tones. In case such allocation of data tones and pilot tones is used, three-block interleaving that is based on the interleaver having the size of 24 may be performed for the 24 data tones included in each 3RRU.

Additionally, in case the number of RRUs being allocated to the STA is equal to 4, among the 26 tones allocated to each RRU, 24 tones may be used as the data tones, and the remaining 2 tones may be used as the pilot tones. More specifically, 4 RRUs (4RRU) may be allocated to 96 data tones and 8 pilot tones. In case such allocation of data tones and pilot tones is used, four-block interleaving that is based on the interleaver having the size of 24 may be performed for the 24 data tones included in each 4RRU.

The allocation of data tones/pilot tones for cases when the number of RRUs is equal to 5 to 8 may be performed by using the same method.

In case the number of RRUs being allocated to the STA is equal to 8, among the 26 tones allocated to each RRU, 24 tones may be used as the data tones, and the remaining 2 tones may be used as the pilot tones. More specifically, 8 RRUs (8RRU) may be allocated to 192 data tones and 16 pilot tones. In case such allocation of data tones and pilot tones is used, eight-block interleaving that is based on the interleaver having the size of 24 may be performed for the 24 data tones included in each 8RRU.

Alternatively, in case the number of RRUs being allocated to the STA is equal to 8, 256 IFFT/FFT corresponding to the legacy 80 MHz bandwidth may be used. More specifically, 234 data tones and 8 pilot tones may be used, and the interleaver that was used for the 256 IFFT/FFT corresponding to the legacy 80 MHz bandwidth may be used for the interleaving of 234 data tones.

Based on the above-described allocation of data tones and pilot tones in accordance with the number of allocated RRUs within the bandwidth of 20 MHz, the allocation of data tones and pilot tones in accordance with the number of allocated RRUs within the bandwidths of 40 MHz and 80 MHz may be performed.

According to the exemplary embodiment of the present invention, the allocated number of data tones and the allocated number of pilot tones in accordance with the allocated RRUs within the bandwidth of 40 MHz may be determined based on the allocation of data tones and pilot tones in accordance with the number of RRU allocations within the bandwidth of 20 MHz, as described above in Table 31.

First of all, in case the number of RRU allocations within the bandwidth of 40 MHz is equal to 1 to 8, the data tones and the pilot tones may be allocated by using the same method as the method used in the case when the number of RRU allocations within the bandwidth of 20 MHz is equal to 1 to 8.

In case the number of RRU allocations within the bandwidth of 40 MHz is equal to 9 to 15, the allocation method of data tones and pilot tones corresponding to the case when the number of RRU allocations within the bandwidth of 20 MHz is equal to 1 to 8 may be used.

For example, in case the number of RRUs allocated within the bandwidth of 40 MHz is equal to 9, the above-described allocation of data tones and pilot tones (option 1 or option 2) corresponding to 8 RRUs within the bandwidth of 20 MHz may be applied to the 8 RRUs, and the above-described allocation of data tones and pilot tones corresponding to one RRU within the bandwidth of 20 MHz may be applied to the one RRU.

Additionally, in case the number of RRUs allocated within the bandwidth of 40 MHz is equal to 10, the above-described allocation of data tones and pilot tones (option 1 or option 2) corresponding to 8 RRUs within the bandwidth of 20 MHz may be applied to the 8 RRUs, and the above-described allocation of data tones and pilot tones corresponding to 2 RRUs within the bandwidth of 20 MHz may be applied to the remaining 2 RRUs. Additionally, in case the number of RRUs allocated within the bandwidth of 40 MHz is equal to 11, the above-described allocation of data tones and pilot tones (option 1 or option 2) corresponding to 8 RRUs within the bandwidth of 20 MHz may be applied to the 8 RRUs, and the above-described allocation of data tones and pilot tones corresponding to 3 RRUs within the bandwidth of 20 MHz may be applied to the remaining 3 RRUs.

In case the number of RRUs being allocated within the bandwidth of 40 MHz by using the above-described method is equal to 12, 13, 14, and 15, allocation of data tones and pilot tones (option 1 or option 2) for 8 RRUs within the bandwidth of 20 MHz may be applied for 8 RRUs, and allocation of data tones and pilot tones (option 1 or option 2) for 4 RRUs, 5 RRUs, 6 RRUs, and 7 RRUs within the bandwidth of 20 MHz may be respectively applied for the remaining 4 RRUs, 5 RRUs, 6 RRUs, and 7 RRUs.

Additionally, in case the number of RRUs allocated within the bandwidth of 40 MHz is equal to 16, the above-described allocation of data tones and pilot tones (option 1 or option 2) corresponding to 8 RRUs within the bandwidth of 20 MHz may be repeated and applied to the 16 RRUs.

Additionally, according to the exemplary embodiment of the present invention, for the data tones and the pilot tones according to the number of RRU allocations within the bandwidth of 80 MHz, the data tones and the pilot tones according to the above-described number of RRU allocations within the bandwidth of 40 MHz may be repeated and applied.

First of all, in case the number of RRU allocations within the bandwidth of 80 MHz is equal to 1 to 16, the data tones and the pilot tones may be allocated by using the same method as the method used in the case when the number of RRU allocations within the bandwidth of 40 MHz is equal to 1 to 16.

In case the number of RRU allocations within the bandwidth of 80 MHz is equal to 17 to 31, the above-described allocation of data tones and pilot tones corresponding to 16 RRUs within the bandwidth of 40 MHz may be applied to the 16 RRUs, and the above-described allocation of data tones and pilot tones corresponding to 1 to 15 RRUs within the bandwidth of 40 MHz may be applied to the remaining RRUs.

Additionally, in case the number of RRUs allocated within the bandwidth of 80 MHz is equal to 32, the above-described allocation of data tones and pilot tones corresponding to 16 RRUs within the bandwidth of 40 MHz may be repeated and applied to the 32 RRUs.

In case the IRU size is equal to 8 tones (in case of an IRU based on 8 subcarriers), the number of data tones is equal to 7, and the number of pilot tones is equal to 1. Such numerology may be applied to the IRU regardless of the number of IRUs being allocated within the entire bandwidth. In case the size of one IRU is equal to 8 tones (or 8 subcarriers), the minimum IRU granularity may be equal to 8 tones. Alternatively, the logical 2IRU corresponding to 16 tones may also be used as minimum IRU granularity. In this case, the size of the data tone may be equal to a multiple of 14.

In case the IRU size is equal to 9 tones (in case of an IRU based on 9 subcarriers), the number of data tones is equal to 8, and the number of pilot tones is equal to 1. Such numerology may be applied to the IRU regardless of the number of IRUs being allocated within the entire bandwidth. In case the size of one IRU is equal to 9 tones (or 9 subcarriers), the minimum IRU granularity may be equal to 9 tones. Alternatively, the logical 2IRU corresponding to 18 tones may also be used as minimum IRU granularity. In this case, the size of the data tone may be equal to a multiple of 16.

Additionally, according to the exemplary embodiment of the present invention, resource allocation may also be performed based on a combination of diverse resource units.

More specifically, a first resource unit having the size of 56 tones, a second resource unit having the size of 26 tones, and a third resource unit having the size of 14 tones may be defined.

Based on 242 tones for resource units within the 20 MHz bandwidth, the tone for resource units within the 40 MHz bandwidth and the 80 MHz bandwidth may be scalably increased. More specifically, 484 tones (242 tones*2) for the 40 MHz bandwidth and 968 tones (242 tones*4) for the 80 MHz bandwidth may be used as the first resource unit and the second resource unit.

Additionally, in the 20 MHz bandwidth, among the 256 tones, the remaining 14 tones excluding the 242 tones may be allocated for the DC tones (3 tones), the left guard tones (6 tones), and the right side tones (5 tones).

The size of the 14 tones for the DC tones, left guard tones, and the right guard tones may be identical to the size of the third resource unit, and, since the size of the first resource unit (56 tones) is the multiple of the size of the third resource unit (14 tones), diverse scalable designs may be performed.

Hereinafter, a detailed resource allocation within the 20 MHz, 40 MHz, and 80 MHz bandwidths will be disclosed.

TABLE 32

| Resource unit | Number of tones | Number of units | Total number of tones |
|---|---|---|---|
| Primary resource unit | 56 | 2 | 112 |
| Secondary resource unit | 26 | 5 | 130 |
| | | | 6 |
| | | | 5 |
| | | | 3 |
| | | | 256 |

Table 32 discloses a resource allocation that is based on a first resource unit and a second resource unit in a 20 MHz bandwidth.

TABLE 33

| Resource unit | Number of tones | Number of units | Total number of tones |
|---|---|---|---|
| Primary resource unit | 56 | 4 | 224 |
| Secondary resource unit | 26 | 10 | 260 |
| Tertiary resource unit | 14 | 1 | 14 |
| | | | 6 |
| | | | 5 |
| | | | 3 |
| | | | 512 |

Table 33 discloses a resource allocation that is based on a first resource unit, a second resource unit, and a third resource unit in a 40 MHz bandwidth.

TABLE 34

| Resource unit | Number of tones | Number of units | Total number of tones |
|---|---|---|---|
| Primary resource unit | 56 | 8 | 448 |
| Secondary resource unit | 26 | 20 | 520 |
| Tertiary resource unit | 14 | 3 | 42 |
| | | | 6 |
| | | | 5 |
| | | | 3 |
| | | | 1024 |

Table 34 discloses a resource allocation that is based on a first resource unit, a second resource unit, and a third resource unit in an 80 MHz bandwidth.

Hereinafter, another detailed resource allocation within the 20 MHz, 40 MHz, and 80 MHz bandwidths will be disclosed.

TABLE 35

| Resource unit | Number of tones | Number of units | Total number of tones |
|---|---|---|---|
| Primary resource unit | 56 | 2 | 112 |
| Secondary resource unit | 26 | 5 | 130 |
| | | | 6 |
| | | | 5 |
| | | | 3 |
| | | | 256 |

Table 35 discloses a resource allocation that is based on a first resource unit and a second resource unit in a 20 MHz bandwidth.

TABLE 36

| Resource unit | Number of tones | Number of units | Total number of tones |
|---|---|---|---|
| Primary resource unit | 56 | 4 | 224 |
| Secondary resource unit | 26 | 10 | 260 |
| Tertiary resource unit | 14 | 1 | 14 |
| | | | 6 |
| | | | 5 |
| | | | 3 |
| | | | 512 |

Table 36 discloses a resource allocation that is based on a first resource unit, a second resource unit, and a third resource unit in a 40 MHz bandwidth.

TABLE 37

| Resource unit | Number of tones | Number of units | Total number of tones |
|---|---|---|---|
| Primary resource unit | 56 | 8 | 448 |
| Secondary resource unit | 26 | 20 | 520 |
| Tertiary resource unit | 14 | 3 | 42 |
| | | | 6 |
| | | | 5 |
| | | | 3 |
| | | | 1024 |

Table 37 discloses a resource allocation that is based on a first resource unit, a second resource unit, and a third resource unit in an 80 MHz bandwidth.

Also, a combination shown below in Table 38 may be used for the 20 MHz bandwidth.

TABLE 38

| Resource unit | Number of tones | Number of units | Total number of tones |
|---|---|---|---|
| Primary resource unit | 56 | 2 | 112 |
| Secondary resource unit | 13 | 10 | 130 |
| | | | 6 |
| | | | 5 |
| | | | 3 |
| | | | 256 |

At this point, one primary resource unit of 56 tones may be divided in units of 28 tones, so as to be divided into 2 resource units of 28 tones and then used, and 2 secondary resource units of 13 tones may be grouped to be used as a resource unit of 26 tones. Moreover, the primary resource units and the secondary resource units may be grouped so as to be used as a resource unit of 242 tones.

Also, a combination shown below in Table 39 to Table 42 may be used for the 40 MHz bandwidth.

TABLE 39

| Resource unit | Number of tones | Number of units | Total number of tones |
|---|---|---|---|
| Primary resource unit | 56 | 4 | 224 |
| Secondary resource unit | 26 | 10 | 260 |
| | | | 6 |
| | | | 5 |
| | | | 17 |
| | | | 512 |

TABLE 40

| Resource unit | Number of tones | Number of units | Total number of tones |
|---|---|---|---|
| Primary resource unit | 56 | 6 | 336 |
| Secondary resource unit | 26 | 6 | 260 |
| | | | 6 |
| | | | 5 |
| | | | 9 |
| | | | 512 |

TABLE 41

| Resource unit | Number of tones | Number of units | Total number of tones |
|---|---|---|---|
| Primary resource unit | 28 | 14 | 392 |
| Secondary resource unit | 13 | 8 | 104 |
| | | | 6 |
| | | | 5 |
| | | | 5 |
| | | | 512 |

TABLE 42

| Resource unit | Number of tones | Number of units | Total number of tones |
|---|---|---|---|
| Primary resource unit | 57 | 6 | 112 |
| Secondary resource unit | 26 | 6 | 156 |
| | | | 6 |
| | | | 5 |
| | | | 3 |
| | | | 512 |

Referring to Table 41, 2 secondary resource units of 13 tones may be grouped to be used as a resource unit of 26 tones. Also, referring to Table 42, 2 primary resource units of 57 tones may be grouped to be used as a resource unit of 114 tones.

Also, a combination shown below in Table 43 to Table 46 may be used for the 80 MHz bandwidth.

TABLE 43

| Resource unit | Number of tones | Number of units | Total number of tones |
|---|---|---|---|
| Primary resource unit | 56 | 8 | 448 |
| Secondary resource unit | 13 | 42 | 546 |
| | | | 6 |
| | | | 5 |
| | | | 19 |
| | | | 1024 |

TABLE 44

| Resource unit | Number of tones | Number of units | Total number of tones |
|---|---|---|---|
| Primary resource unit | 56 | 10 | 560 |
| Secondary resource unit | 13 | 34 | 442 |
| | | | 6 |
| | | | 5 |
| | | | 11 |
| | | | 1024 |

TABLE 45

| Resource unit | Number of tones | Number of units | Total number of tones |
|---|---|---|---|
| Primary resource unit | 57 | 14 | 798 |
| Secondary resource unit | 26 | 8 | 208 |
| | | | 6 |
| | | | 5 |
| | | | 7 |
| | | | 1024 |

TABLE 46

| Resource unit | Number of tones | Number of units | Total number of tones |
|---|---|---|---|
| Primary resource unit | 114 | 1 | 114 |
| Secondary resource unit | 56 | 16 | 896 |
| | | | 6 |
| | | | 5 |
| | | | 3 |
| | | | 1024 |

Referring to Table 43 and Table 44, 2 secondary resource units of 13 tones may be grouped to be used as a resource unit of 26 tones. And, referring to Table 45, 2 primary resource units of 57 tones may be grouped to be used as a resource unit of 114 tones.

In the wireless LAN system according to the exemplary embodiment of the present invention, a PPDU may be generated based on a IFFT size that is N times (e.g., N=4) larger than the legacy wireless LAN system and may decode the PPDU based on a FFT size that is N times larger. Such FFT size/IFFT size that are N times larger may be applied to the remaining part (payload) (MAC protocol data unit (MPDU)) of the PPDU excluding the PPDU header or may be applied some of the fields in the PPDU header and payload. In case the IFFT that is N times larger is used, the length of a valid symbol for the transmission of the PPDU may be increased to N times its initial length. Additionally, even if the IFFT that is N times larger is not applied for the OFDM symbol transmitting the HE-SIG of the PPDU, a longer cyclic prefix (CP) may be applied to the OFDM symbol, thereby enhancing the transmission coverage.

In the wireless LAN system according to the exemplary embodiment of the present invention, diverse CP lengths may be used. For example, the length of the CP may be equal to 0.4 μs, 0.8 μs, 1.6 μs, 2.4 μs, 3.2 μs, and so on. Depending upon the communication environment, different CPs may be used. In case a plurality of CPs are optionally used, the throughput of the wireless LAN system may be enhanced, and, most particularly, the performance of the wireless LAN system in an outdoor environment may be enhanced. For example, in order to increase the throughput of the wireless LAN system, a CP of 0.8 μs is used, and in order to enhance the performance of the wireless LAN system in an outdoor environment, a CP of 3.2 μs may be used. Moreover, the wireless LAN system according to the exemplary embodiment of the present invention may support uplink multi-user (UL MU) transmission. The transmission of uplink data within an overlapping time resource may be performed by each of the plurality of STAs based on the UL MU transmission. An uplink indicates a transmission link from the STA to the AP, and a downlink indicates a transmission link from the AP to the STA.

Additionally, in the wireless LAN system according to the exemplary embodiment of the present invention, a pilot (pilot signal or pilot tone (or pilot subcarrier)) may be categorized as a common pilot and a dedicated pilot. A common pilot may be shared by all users and may generally be used in a downlink. As a pilot dedicated to a specific user, a dedicated pilot may generally be used in an uplink. The dedicated pilot may also be used in a downlink.

The number and positions of the pilots may be determined in accordance with a resource allocation method and a subband granularity.

Most particularly, in the wireless LAN system according to the exemplary embodiment of the present invention, a scalable resource allocation may be supported in accordance with a minimum resource granularity. In case of a downlink transmission, a pilot may be allocated to the outside of each resource unit, and, in case of an uplink transmission, a pilot may be allocated to the inside of each resource unit. A pilot structure that was used in the legacy wireless LAN system may also be used.

Two different methods may be discussed for the resource allocation (subband granularity).

Method 1 may define resource units re-using previous resource units and may additionally define a new minimum resource unit. For example, in case 256FFT/IFFT is used, resources units of 26 tones, 56 tones, 114 tones, and 242 tones, which correspond to the sizes of the previous resource units, and a resource unit of 14 tones, which corresponds to the new minimum resource unit, may be defined. Such resource units may be supported by the encoding procedure and the interleaving procedure of the legacy wireless LAN system. Each resource unit includes data tones and pilot tones.

Method 2 may define resource units so as to allow a scalable design of the minimum resource granularity to be carried out. For example, in case the minimum granularity of the resource unit is equal to X tones, the size of an allocatable resource unit may be equal to a multiple of X, X*{1, 2, 3, 4, . . . }. For example, the resource unit corresponding to the minimum granularity may include 12 data tones. In case 12 multiple units of the data tones are included in the resource unit, diverse MCS may be supported in the resource unit.

A pilot may be included or may not be included depending upon whether the pilot is in common usage or in dedicated usage. In case such scalable design is used, if an adequate minimum resource granularity is well-selected, the minimum resource granularity may be flexibly applied to most part of the data unit. Moreover, a resource unit that is based on the minimum resource granularity may be easily scheduled in accordance with the sizes of diverse traffic data.

A resource unit is that is defined in order to allow the scalable design of Method 2 to be carried out, the following criteria may be additionally considered and determined.

In order to avoid non-conformity between the coverage of the downlink and the coverage of the uplink, resource units may be defined so that commonality exists between downlink resources and uplink resources.

Additionally, excessively small resource granularity may increase overhead for scheduling and signaling. Therefore, the minimum resource granularity shall be determined while considering such overhead for scheduling and signaling.

Moreover, the overhead caused by pilots shall also be considered. In case a size that is N times the IFFT size is applied for the common pilot, since the number of tones is also increased by N times, the relative overhead caused by the pilot may be reduced.

Hereinafter, a resource allocation method of a dedicated resource unit and a resource allocation method of a common resource unit will be disclosed. Herein, a dedicated resource unit corresponds to a resource unit including pilot tones, and a common resource unit corresponds to a resource unit that does not include any pilot tones.

First of all, a scalable resource allocation based on the dedicated resource unit will be disclosed.

For example, the dedicated resource unit may correspond to a resource unit of 14 tones. The resource unit of 14 tones may include 12 data tones and 2 pilot tones. In a 20 MHz bandwidth, among the entire 256 tones, 17 dedicated resource units may be allocated to 238 tones (14*17), and DC tones, left guard tones, and right guard tones may be allocated to the remaining 18 tones. And, in a 40 MHz bandwidth, among the entire 512 tones, 35 dedicated resource units may be allocated to 490 tones (14*35), and DC tones, left guard tones, and right guard tones may be allocated to the remaining 22 tones. And, in a 80 MHz bandwidth, among the entire 1024 tones, 72 dedicated resource units may be allocated to 1008 tones (14*72), and DC tones, left guard tones, and right guard tones may be allocated to the remaining 16 tones.

As another example, the dedicated resource unit may correspond to a resource unit of 26 tones. The resource unit of 26 tones may include 24 data tones and 2 pilot tones. In a 20 MHz bandwidth, among the entire 256 tones, 9 dedicated resource units may be allocated to 234 tones (26*9), and DC tones, left guard tones, and right guard tones may be allocated to the remaining 22 tones. And, in a 40 MHz bandwidth, among the entire 512 tones, 19 dedicated resource units may be allocated to 494 tones (26*19), and DC tones, left guard tones, and right guard tones may be allocated to the remaining 18 tones. And, in a 80 MHz bandwidth, among the entire 1024 tones, 38 dedicated resource units may be allocated to 988 tones (26*38), and DC tones, left guard tones, and right guard tones may be allocated to the remaining 36 tones.

As yet another example, the dedicated resource unit may correspond to a resource unit of 56 tones. The resource unit of 56 tones may include 52 data tones and 4 pilot tones. In a 20 MHz bandwidth, among the entire 256 tones, 4 dedicated resource units may be allocated to 224 tones (56*4), and DC tones, left guard tones, and right guard tones may be allocated to the remaining 32 tones. And, in a 40 MHz bandwidth, among the entire 512 tones, 8 dedicated resource units may be allocated to 448 tones (56*8), and DC tones, left guard tones, and right guard tones may be allocated to the remaining 64 tones. And, in a 80 MHz bandwidth, among the entire 1024 tones, 18 dedicated resource units may be allocated to 1008 tones (56*18), and DC tones, left guard tones, and right guard tones may be allocated to the remaining 16 tones.

Different dedicated resource unit sizes may be used depending upon the bandwidth. For example, a dedicated resource unit of 14 tones or 26 tones may be used in the bandwidths of 20 MHz and 40 MHz, and a dedicated resource unit of 56 tones may be used in the bandwidth of 80 MHz.

Hereinafter, a scalable resource allocation based on the common resource unit will be disclosed.

For example, the dedicated resource unit may correspond to a resource unit of 12 tones. The resource unit of 12 tones may include 12 data tones. In a 20 MHz bandwidth, among the entire 256 tones, 19 dedicated resource units may be allocated to 228 tones (12*19), and pilot tones, DC tones, left guard tones, and right guard tones may be allocated to the remaining 28 tones. And, in a 40 MHz bandwidth, among the entire 512 tones, 40 dedicated resource units may be allocated to 480 tones (12*40), and pilot tones, DC tones, left guard tones, and right guard tones may be allocated to the remaining 32 tones. And, in a 80 MHz bandwidth, among the entire 1024 tones, 83 dedicated resource units may be allocated to 996 tones (12*83), and pilot tones, DC tones, left guard tones, and right guard tones may be allocated to the remaining 28 tones.

As another example, the dedicated resource unit may correspond to a resource unit of 24 tones. The resource unit of 24 tones may include 24 data tones. In a 20 MHz bandwidth, among the entire 256 tones, 9 dedicated resource units may be allocated to 216 tones (24*9), and pilot tones, DC tones, left guard tones, and right guard tones may be allocated to the remaining 40 tones. And, in a 40 MHz bandwidth, among the entire 512 tones, 20 dedicated resource units may be allocated to 480 tones (24*20), and pilot tones, DC tones, left guard tones, and right guard tones may be allocated to the remaining 32 tones. And, in a 80 MHz bandwidth, among the entire 1024 tones, 41 dedicated resource units may be allocated to 984 tones (24*41), and pilot tones, DC tones, left guard tones, and right guard tones may be allocated to the remaining 40 tones.

As yet another example, the dedicated resource unit may correspond to a resource unit of 36 tones. The resource unit of 36 tones may include 36 data tones. In a 20 MHz bandwidth, among the entire 256 tones, 6 dedicated resource units may be allocated to 216 tones (36*6), and pilot tones, DC tones, left guard tones, and right guard tones may be allocated to the remaining 40 tones. And, in a 40 MHz bandwidth, among the entire 512 tones, 13 dedicated resource units may be allocated to 468 tones (36*13), and pilot tones, DC tones, left guard tones, and right guard tones may be allocated to the remaining 44 tones. And, in a 80 MHz bandwidth, among the entire 1024 tones, 27 dedicated resource units may be allocated to 972 tones (36*27), and pilot tones, DC tones, left guard tones, and right guard tones may be allocated to the remaining 52 tones.

As yet another example, the dedicated resource unit may correspond to a resource unit of 48 tones. The resource unit of 48 tones may include 48 data tones. In a 20 MHz bandwidth, among the entire 256 tones, 4 dedicated resource units may be allocated to 192 tones (48*4), and pilot tones, DC tones, left guard tones, and right guard tones may be allocated to the remaining 64 tones. And, in a 40 MHz bandwidth, among the entire 512 tones, 10 dedicated resource units may be allocated to 480 tones (48*10), and pilot tones, DC tones, left guard tones, and right guard tones may be allocated to the remaining 32 tones. And, in a 80 MHz bandwidth, among the entire 1024 tones, 20 dedicated resource units may be allocated to 960 tones (48*20), and pilot tones, DC tones, left guard tones, and right guard tones may be allocated to the remaining 64 tones.

Hereinafter, in case STAs communicating through diverse bandwidths within the BSS exist, the exemplary embodiment of the present invention discloses a method of using an IRU (or small tone unit (STU)) as resource for a guard tone or DC tone.

Figure 10:
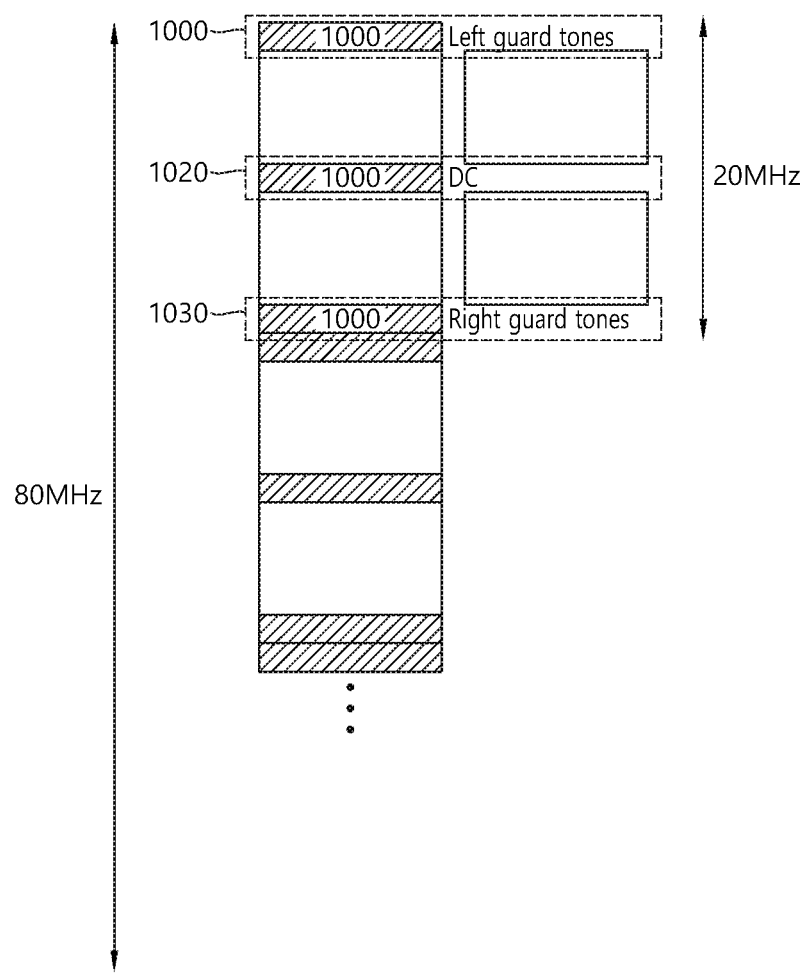
FIG. 10 is a conceptual view illustrating a resource allocation according to an exemplary embodiment of the present invention.

FIG. 10 is a conceptual view illustrating a resource allocation according to an exemplary embodiment of the present invention.

FIG. 10 discloses a method for supporting an STA performing communication based on a bandwidth (or front-end) of 20 MHz or 40 MHz in a BSS (or AP) supporting a bandwidth (or front-end) of 80 MHz Referring to FIG. 10, an STA supporting a bandwidth of 20 MHz or 40 MHz may be located in a BSS (or basic service area (BSA)) supporting a bandwidth of 80 MHz. In this case, in order to prevent interference from being experienced by the STA supporting the bandwidth of 20 MHz or 40 MHz, part of the band for an OFDMA packet (or PPDU) that is being transmitted in the 80 MHz bandwidth may be used as a guard tone or DC tone for an STA having a front-end of 20 MHz or 40 MHz.

In order to use part of the frequency resource within the 80 MHz bandwidth as the guard tone or DC tone for the STA having a front-end of 20 MHz or 40 MHz, among the resource units being allocated within the 80 MHz bandwidth, a specific resource unit (e.g., IRU) (or frequency resource), which corresponds to the position corresponding to the guard tone or DC tone for the STA supporting the bandwidth of 20 MHz or 40 MHz, may be used as a guard tone or DC tone instead of being used as a resource for data transmission.

As shown in FIG. 10, in case a resource unit (RRU (or basic tone unit BTU), IRU (or small tone unit (STU)) is allocated within a bandwidth of 80 MHz, among part of the resource units, part of the resource units (e.g., IRU) 1000 may be allocated to the regions of the DC tone 1020 and the guard tones 1010 and 1030. More specifically, as shown in FIG. 10, a resource unit 1000 of the 80 MHz bandwidth, which corresponds to the DC tone and the guard tones of the bandwidth of 20 MHz, may be allocated to the DC tone 1020 and the guard tones 1010 and 1030. Similarly, a resource unit of the 80 MHz bandwidth, which corresponds to the DC tone and the guard tones of the bandwidth of 40 MHz, may be allocated to the DC tone and the guard tones.

The above-described method for allocating the DC tone and the guard tones may also be similarly applied to a case when the BSS supports a bandwidth (front-end) of 40 MHz and when an STA performing communication based on a bandwidth of 20 MHz within the corresponding BSS (or BSA) exists. In other words, in case a resource unit (RRU (or BTU), IRU (or STU)) is allocated within a bandwidth of 40 MHz, among part of the resource units, part of the resource units (e.g., IRU) may be allocated to the regions of the DC tone and the guard tones. More specifically, a resource unit of the 40 MHz bandwidth, which corresponds to the DC tone and the guard tones of the bandwidth of 20 MHz, may be allocated to the DC tone and the guard tones.

More specifically, in the present invention, a resource unit of a second bandwidth, which corresponds to the DC tone and the guard tones of a first bandwidth, may be allocated to the DC tone and the guard tones instead of the data tones. Herein, the second bandwidth may be larger than the first bandwidth. Alternatively, in the present invention, a resource unit of a second bandwidth, which corresponds to the DC tone and the guard tones of a first bandwidth, may simply be not used. Alternatively, in the present invention, a frequency resource of a second bandwidth, which corresponds to the DC tone and the guard tones of a first bandwidth, may simply be not used. for simplicity in the description of the present invention, a case when a resource unit of a second bandwidth, which corresponds to the DC tone and the guard tones of a first bandwidth, will mostly be assumed herein.

Hereinafter, a resource unit, which is being used as a DC tone/guard tone for preventing interference instead of being used as a data transmission resource (or data tone), may be expressed by the term DC tone transmission unit/guard tone transmission unit. Part of the frequency resource that was used as a data tone, which is not divided into resource units for preventing interference, may also be used as the DC tone/guard tone.

According to the exemplary embodiment of the present invention, the AP may transmit information indicating that a specific resource unit is being used as DC tone/guard tone for preventing interference instead of being used as data transmission resource (hereinafter, DC tone/guard tone allocation information) to the STA, which is included in the BSS.

Figure 11:
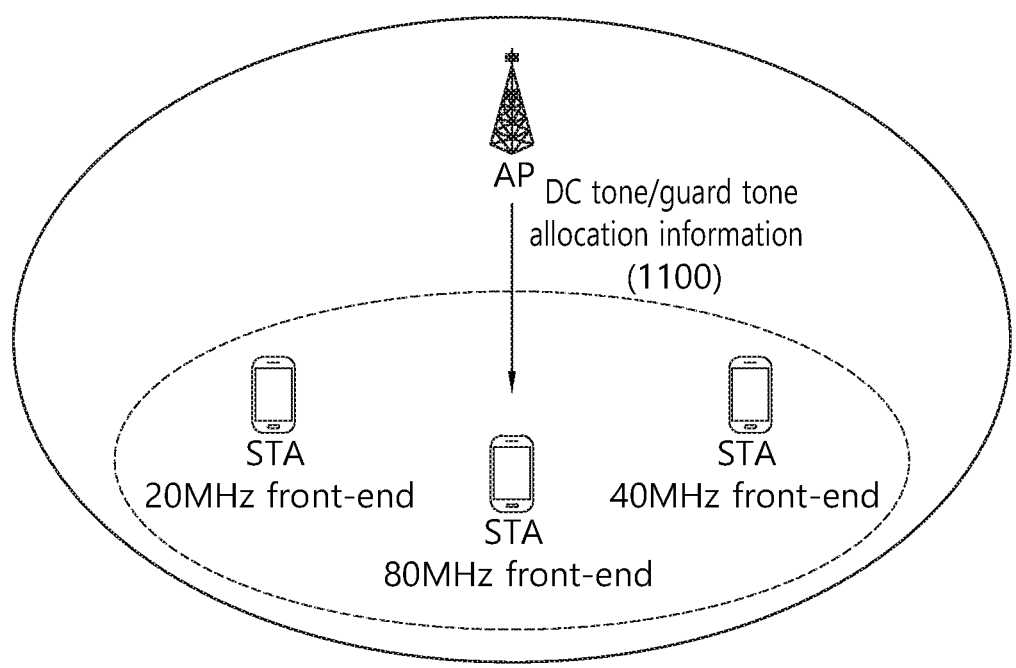
FIG. 11 is a conceptual view illustrating a method for transmitting DC tone/guard tone allocation information according to an exemplary embodiment of the present invention.

FIG. 11 is a conceptual view illustrating a method for transmitting DC tone/guard tone allocation information according to an exemplary embodiment of the present invention.

Referring to FIG. 11, by transmitting DC tone/guard tone allocation information 1100, the AP may indicate to the STA that a specific resource unit is being not used for data transmission in an environment where STAs respectively supporting different bandwidths co-exist (or in a diverse BS capability environment).

The STA may receive the DC tone/guard tone allocation information 1100 and may not transmit any channel feedback information on the frequency band corresponding to DC tone transmission unit/guard tone transmission unit. More specifically, since the DC tone transmission unit/guard tone transmission unit is not being used for the data transmission performed by the AP/data transmission performed by the STA, the STA may not transmit any separate feedback information on the DC tone transmission unit/guard tone transmission unit.

Additionally, the RRU (BTU) and the IRU (STU) may be diversely located within the frequency band. The AP may allocate the RRU (BTU) and the IRU (STU) in diverse combinations within the frequency band. In this case, the positions of the DC tone transmission unit and the guard tone transmission unit may be varied in accordance with the combination of the resource allocation. Therefore, the AP may transmit information on the allocation of such resource units to the STA. The STA may determine which transmission unit (or frequency band) corresponds to the DC tone transmission unit/guard tone transmission unit based on the information on the allocation of resource units and the DC tone/guard tone allocation information 1100.

In the wireless LAN system, a method for allocating a resource unit in accordance with the size of the bandwidth may be defined in advance, and the method for allocating a resource unit in accordance with the size of the bandwidth may be defined as a specific indicator within a table, and, then, based on this indicator, the AP may transmit the information on the allocation of resource units.

The above-described information on the allocation of resource units and/or DC tone/guard tone allocation information 1100 may be transmitted as general information to multiple STAs being included in the BSS based on a signal field of the PPDU being transmitted by the AP (or may be transmitted based on broadcast).

More specifically, the AP may transmit the information on the allocation of resource units and/or the DC tone/guard tone allocation information 1100 to the STAs being included in the BSS through a signal field (e.g., HE-SIG 1 (or RE-SIG A)) transmitting general information.

For example, the DC tone/guard tone allocation information 1100 may be allocated to x bits of the signal field, and the x bits may indicate that a specific resource unit (or specific band) (e.g., IRU) is being used as the DC tone transmission unit/guard tone transmission unit. At this point, the size of x may be determined by a function that is related to the number of resource units.

Alternatively, in case STAs supporting 20 MHz and 40 MHz are included in the BSS, the AP may also transmit information on the allocation of resource units corresponding to the size of the bandwidth, which is being supported by the STAs. For example, the information on the allocation of the resource units may be allocated to 1 bit or 2 bits in an IRU allocation structure (i.e., as information indicating that the specific IRU is not being used), which corresponds to the size of the bandwidth being supported by the STAs.

Figure 12:
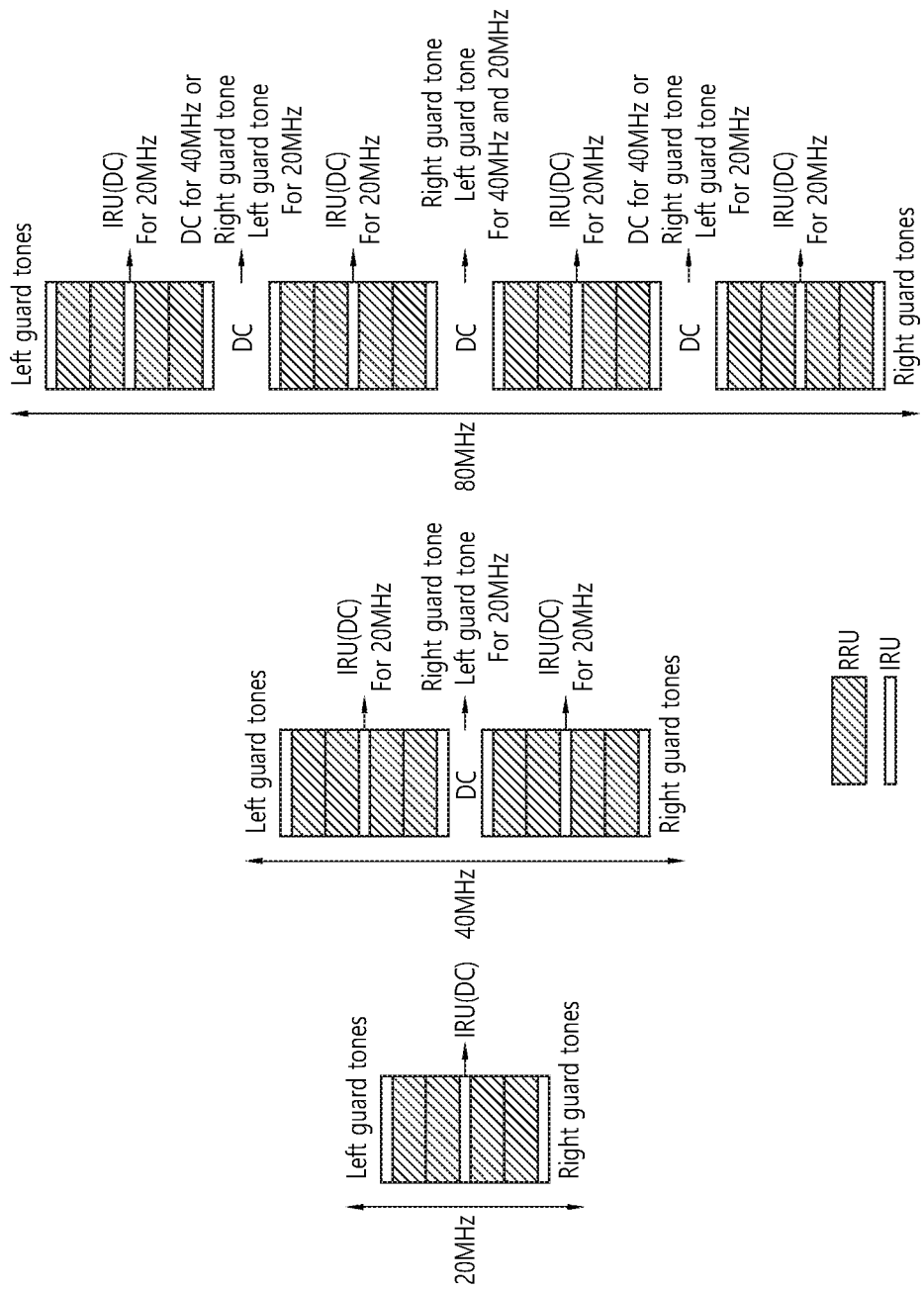
FIG. 12 is a conceptual view illustrating a tone allocation method according to an exemplary embodiment of the present invention.

FIG. 12 is a conceptual view illustrating a tone allocation method according to an exemplary embodiment of the present invention.

FIG. 12 discloses resource allocation within the entire bandwidth based on the allocation of the DC tone transmission unit/guard tone transmission unit, which is described above in FIG. 10 and FIG. 11. It will be assumed that the size of a minimum bandwidth (or front-end), which is supported by the STA, is equal to 20 MHz. Additionally, it will also be assumed that the size of each of the different front-ends being respectively supported by each of the plurality of STAs is equal to 20 MHz, 40 MHz, or 80 MHz. Moreover, the size of each of the different front-ends being respectively supported by each of the plurality of STAs may also be extended to 80+80 MHz, 160 MHz, and so on. The above-described size of the minimum bandwidth being supported by the STA and the sizes of multiple bandwidths each being respectively supported by multiple STAs are exemplary sizes. And, therefore, the sizes may be diversely configured to have different values, and such exemplary embodiments of the present invention may also be included in the scope of the present invention. Furthermore, cases when the RRU (also referred to as BTU) and the IRU (also referred to as STU) are used as the resource unit will also be assumed herein.

Basically, the allocation structure may be designed so that a DC tone is located at the center of a bandwidth unit of 20 MHz and that left guard tone/right guard tone are located at both ends of the bandwidth.

More specifically, in a case when it is assumed that the DC tone transmission unit/guard tone transmission unit corresponds to the IRU, the allocation structure may be designed to have a structure of left guard tone/IRU/RRU/IRU/RRU/IRU/right guard tone in units of 20 MHz. This structure may be applied by being scaled in accordance with the size of the bandwidth, thereby being applied to each of the bandwidth of 40 MHz and the bandwidth of 80 MHz.

Among the allocated resource units, the AP may determine whether to use the IRU as the DC tone transmission unit/guard tone transmission unit or whether to use the IRU as data tone for transmitting data. The AP may transmit the determined result on whether or not to use the IRU as the DC tone transmission unit/guard tone transmission unit to the STA. For example, in case STAs supporting a plurality of bandwidths each being different from one another exists in the BSS, among the allocated resource units, the AP may determine to use the IRU as the DC tone transmission unit/guard tone transmission unit.

The above-described determined result of the AP on determining whether or not to use the IRU as the DC tone transmission unit/guard tone transmission unit may be transmitted to the STAs existing in the BSS as general information through a signal field (e.g., HE-SIG A (or HE-SIG 1)) (or may be transmitted based on a broadcast transmission).

Referring to FIG. 12, an exemplary resource allocation method for configuring a DC tone transmission unit/guard tone transmission unit will be disclosed.

For example, the RRU may be allocated to 56 tones, and the IRU may be allocated to 7 tones. And, a 14-tone resource unit, which is configured of a group of 2 IRUs, may also be allocated as the minimum resource unit.

Referring to the left side of FIG. 12, for the bandwidth of 20 MHz, left guard tone (6 tones)/IRU/RRU/RRU/IRU (this may be used as a DC tone)/RRU/RRU/IRU/right guard tone (5 tones) may be allocated.

Also, referring to the center of FIG. 12, for the bandwidth of 40 MHz, left guard tone (6 tones)/IRU/RRU/RRU/IRU (this may be used as a DC tone transmission unit for the 20 MHz front-end)/RRU/RRU/IRU/DC (11 tones, this performs the function of a DC tone for the 40 MHz front-end or right guard tone (5 tones)+left guard tone (6 tones) for the 20 MHz front-end)/IRU/RRU/RRU/IRU (this may be used as a DC tone transmission unit for the 20 MHz front-end)/RRU/RRU/IRU/right guard tone (5 tones) may be allocated.

More specifically, in order to reduce interference on the STA, which supports the bandwidth of 20 MHz, a DC tone transmission unit (or DC tone)/guard tone transmission unit (or guard tone) may be used for each of the two 20 MHz bandwidths included in the bandwidth of 40 MHz.

Also, referring to right side of FIG. 12, for the bandwidth of 80 MHz, left guard tone (6 tones)/IRU/RRU/RRU/IRU (this may be used as a DC tone transmission unit for the 20 MHz front-end)/RRU/RRU/IRU/DC (11 tones, this performs the function of a DC tone for the 40 MHz front-end or right guard tone (5 tones)+left guard tone (6 tones) for the 20 MHz front-end)/IRU/RRU/RRU/IRU (this may be used as a DC tone transmission unit for the 20 MHz front-end)/RRU/RRU/IRU/DC (11 tones, this performs the function of a DC tone for the 80 MHz front-end or right guard tone (5)+left guard tone (6) for the 40 MHz front-end)/IRU/RRU/RRU/IRU (this may be used as a DC tone transmission unit for the 20 MHz front-end)/RRU/RRU/IRU/DC (11 tones, this performs the function of a DC tone for the 40 MHz front-end or right guard tone (5 tones)+left guard tone (6 tones) for the 20 MHz front-end)/IRU/RRU/RRU/IRU (this may be used as a DC tone transmission unit for the 20 MHz front-end)/RRU/RRU/IRU/right guard tone (5 tones) may be allocated.

In the combination according to each size of the above-described bands, the left guard tone/right guard tone and the DC tone may form other combinations.

The following discloses yet another exemplary resource allocation method for configuring DC tone transmission unit/guard tone transmission unit.

For the bandwidth of 20 MHz, left guard tone (7 tones)/IRU/RRU/RRU/DC tone (5 tones)/RRU/RRU/IRU/right guard tone (6 tones) may be allocated.

For the bandwidth of 40 MHz, left guard tone (7 tones)/IRU/RRU/RRU/DC (this may be used as a DC tone transmission unit for the 20 MHz front-end, 5 tones)/RRU/RRU/IRU/DC (13 tones, DC tone for the 40 MHz front-end or right guard tone (6 tones)+left guard tone (7 tones) for the 20 MHz front-end)/IRU/RRU/RRU/DC (this may be used as a DC tone transmission unit for the 20 MHz front-end, 5 tones)/RRU/RRU/IRU/right guard tone (6 tones) may be allocated.

For the bandwidth of 80 MHz, left guard tone (7 tones)/IRU/RRU/RRU/DC (5 tones, this may be used as a DC tone transmission unit for the 20 MHz front-end)/RRU/RRU/IRU/DC (13 tones, this performs the function of a DC tone for the 40 MHz front-end or right guard tone (6 tones)+left guard tone (7 tones) for the 20 MHz front-end)/IRU/RRU/RRU/DC (5 tones, this may be used as a DC tone transmission unit for the 20 MHz front-end)/RRU/RRU/IRU/DC (13 tones, this performs the function of a DC tone for the 80 MHz front-end or right guard tone (6 tones)+left guard tone (7 tones) for the 40 MHz front-end)/IRU/RRU/RRU/DC (this may be used as a DC tone transmission unit for the 20 MHz front-end)/RRU/RRU/IRU/DC (13 tones, this performs the function of a DC tone for the 40 MHz front-end or right guard tone (6 tones)+left guard tone (7 tones) for the 20 MHz front-end)/IRU/RRU/RRU/DC (this may be used as a DC tone transmission unit for the 20 MHz front-end)/RRU/RRU/IRU/right guard tones (6 tones) may be allocated.

Depending upon how the combined front-ends are combined, the wireless resource being allocated to the DC tone transmission unit (or DC tone)/guard tone transmission unit (or guard tone) may also be used for data transmission.

According to the exemplary embodiment of the present invention, a plurality of resource units may be combined so as to configure another resource unit, and another resource unit, which is configured by the combination of a plurality of resource units, may be used as one resource unit. Hereinafter, another resource unit that is configured by the combination of a plurality of resource units may also be expressed by using the term logical combination resource unit.

For example, a plurality of IRUs may be combined to configure one logical combination resource unit having the same size as the size of a RRU. In case an IRU size is equal to 14 tones, and if one logical combination resource unit is configured by grouping 4 IRUs, one logical combination resource unit may correspond to 56 tones. And, 56 tones may correspond to the RRU size.

Additionally, two RRUs of 56 tones may be grouped (or combined) so as to configure one logical combination resource unit corresponding to 112 tones. The one logical combination resource unit corresponding to 112 tones may be collectively interleaved or interleaving may be performed on each of the two 56-tone RRUs.

Alternatively, two 56-tone RRUs and at least one 14-tone IRU may be grouped (or combined) to configured one logical combination resource unit corresponding to 114 tones. In case two 56-tones RRUs and at least one IRU is grouped, this may be equal to 126 tones. Among the 126 tones, only 114 tones may be used for configuring the logical combination resource unit, and the remaining (or leftover) 14 tones may not be used. Since the 114 tones corresponds to a size that is the same as the resource unit that was used in the legacy wireless LAN system, the legacy pilot allocation and interleaving method may be used. For example, among the 114 tones, pilot tones may be allocated to 6 tones, and data tones may be allocated to the remaining 108 tones. For the data tones of 108 tones, an interleaving process that is based on a 108-size interleaver may be performed.

Alternatively, one logical combination resource unit corresponding to 224 tones may be configured based on a grouping (or combination) of four 56-tone RRUs. Interleaving that is based on one interleaver may be performed on the logical combination resource unit corresponding 224 tones, or interleaving may be separately performed on each resource unit corresponding to 56 tones. In case interleaving is separately performed on each of the individual resource units corresponding to 56 tones, a 4-block interleaving may be used based on a 52-size interleaver.

Alternatively, one logical combination resource unit corresponding to 242 tones may be configured based on a combination of four 56-tone RRUs and three IRUs. Among the tones (266 tones) configured by the combination of the four 56-tone RRUs and the three IRUs, with the exception for the 242 tones for the logical combination resource unit, the remaining 24 tones may not be used. Since the 242 tones corresponds to a size that is the same as the resource unit that was used in the legacy wireless LAN system, the legacy pilot allocation and interleaving method may be used. For example, among the 242 tones, pilot tones may be allocated to 8 tones, and data tones may be allocated to the remaining 234 tones. For the data tones of 234 tones, an interleaving process that is based on a 234-size interleaver may be performed.

Alternatively, in case of allocating a size that is larger than 242 tones to the logical combination resource unit, tones corresponding to a multiple of the 242 tones may be allocated to the logical combination resource unit. For example, in a bandwidth of 80 MHz, one logical combination resource unit corresponding to 484 tones, which is equal to 2 times the size of 242 tones, may be used.

Figure 13:
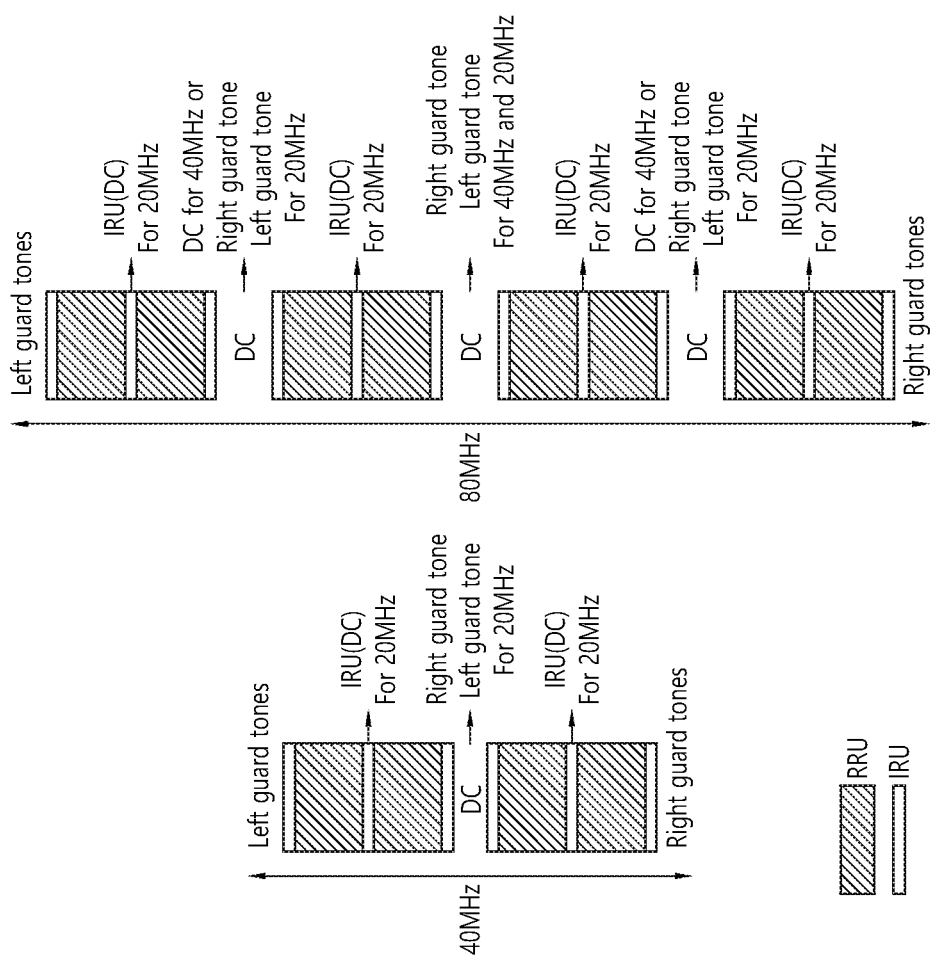
FIG. 13 is a conceptual view illustrating a tone allocation method according to an exemplary embodiment of the present invention.

FIG. 13 is a conceptual view illustrating a tone allocation method according to an exemplary embodiment of the present invention.

FIG. 13 discloses an allocation of resource units based on the DC tone transmission unit/guard tone transmission unit, in a case when the RRU size is equal to 114 tones and the IRU size is equal to 7 tones. Two IRUs may be grouped (or combined) to be configured and used as one logical combination resource unit.

Referring to the left side of FIG. 13, for the 40 MHz bandwidth, left guard tone (6 tones)/IRU/RRU/IRU (this may be used as a DC tone transmission unit for the 20 MHz front-end)/RRU/IRU/DC (DC tone for the 40 MHz front-end, 3 tones)/IRU/RRU/IRU (this may be used as a DC tone transmission unit for the 20 MHz front-end)/RRU/IRU/right guard tone (5 tones) may be allocated.

Referring to the right side of FIG. 13, for the 80 MHz bandwidth, left guard tone (6 tones)/IRU/RRU/IRU (this may be used as a DC tone transmission unit for the 20 MHz front-end)/RRU/IRU/DC (this may be used as a DC tone transmission unit for the 40 MHz front-end, 3 tones)/IRU/RRU/IRU (this may be used as a DC tone transmission unit for the 20 MHz front-end)/RRU/IRU/DC (11 tones, this performs the function of a tone for the 80 MHz front-end or right guard tone (5 tones)+left guard tone (6 tones) for the 40 MHz front-end))/IRU/RRU/IRU (this may be used as a DC tone transmission unit for the 20 MHz front-end)/RRU/IRU/DC (this may be used as a DC tone transmission unit for the 40 MHz front-end, 3 tones)/IRU/RRU/IRU (this may be used as a DC tone transmission unit for the 20 MHz front-end)/RRU/IRU/right guard tone (5 tones) may be allocated.

Depending upon how the combined front-ends are combined, the wireless resource being allocated to the DC tone transmission unit (or DC tone)/guard tone transmission unit (or guard tone) may also be used for data transmission. In the above-described combination according to the bandwidth, other combinations of the left guard tone, right guard tone, and DC tone may also be configured as described below.

For the 40 MHz bandwidth, left guard tone (6 tones)/IRU/RRU/DC (5 tones, this may be used as a DC tone transmission unit for the 20 MHz front-end)/RRU/IRU/DC (7 tones, this may be used as a DC tone transmission unit for the 40 MHz front-end)/IRU/RRU/DC (5 tones, this may be used as a DC tone transmission unit for the 20 MHz front-end)/RRU/IRU/right guard tone (5 tones) may be allocated.

For the 80 MHz bandwidth, left guard tone (6 tones)/IRU/RRU/DC (5 tones, this may be used as a DC tone transmission unit for the 20 MHz front-end)/RRU/IRU/DC (7 tones, this may be used as a DC tone transmission unit for the 40 MHz front-end)/IRU/RRU/DC (5 tones, this may be used as a DC tone transmission unit for the 20 MHz front-end)/RRU/IRU/DC (11 tones, this performs the function of a DC tone for the 80 MHz front-end or right guard tone (5 tones)+left guard tone (6 tones) for the 40 MHz front-end)/IRU/RRU/DC (5 tones, this may be used as a DC tone transmission unit for the 20 MHz front-end)/RRU/IRU/DC (7 tones, this may be used as a DC tone transmission unit for the 40 MHz front-end)/IRU/RRU/DC (3 tones, this may be used as a DC tone transmission unit for the 20 MHz front-end)/RRU/IRU/right guard tone (5 tones) may be allocated.

Depending upon how the combined front-ends are combined, the wireless resource being allocated to the DC tone transmission unit (or DC tone)/guard tone transmission unit (or guard tone) may also be used for data transmission. In the above-described combination according to the bandwidth, other combinations of the left guard tone, right guard tone, and DC tone may also be configured as shown in FIG. 13.

In case the RRU size is equal to 114 tones, two RRUs may be grouped (or combined) to configure one logical combination resource unit corresponding to 228 tones. The logical combination resource unit corresponding to 228 tones may be collectively interleaved or interleaving may be separately performed for each RRUs corresponding to 114 tones.

Additionally, one logical combination resource unit corresponding to 242 tones may be defined by grouping (or combining) two RRUs and two IRUs. Remaining tones may not be used. Since the 242 tones corresponds to a size that is the same as the resource unit that was used in the legacy wireless LAN system, the legacy pilot allocation and interleaving method may be used. For example, among the 242 tones, pilot tones may be allocated to 8 tones, and data tones may be allocated to the remaining 234 tones. For the data tones of 234 tones, an interleaving process that is based on a 234-size interleaver may be performed.

Alternatively, in case of allocating a size that is larger than 242 tones to the logical combination resource unit, tones corresponding to a multiple of the 242 tones may be allocated to the logical combination resource unit. For example, in a bandwidth of 80 MHz, one logical combination resource unit corresponding to 484 tones, which is equal to 2 times the size of 242 tones, may be used.

Figure 14:
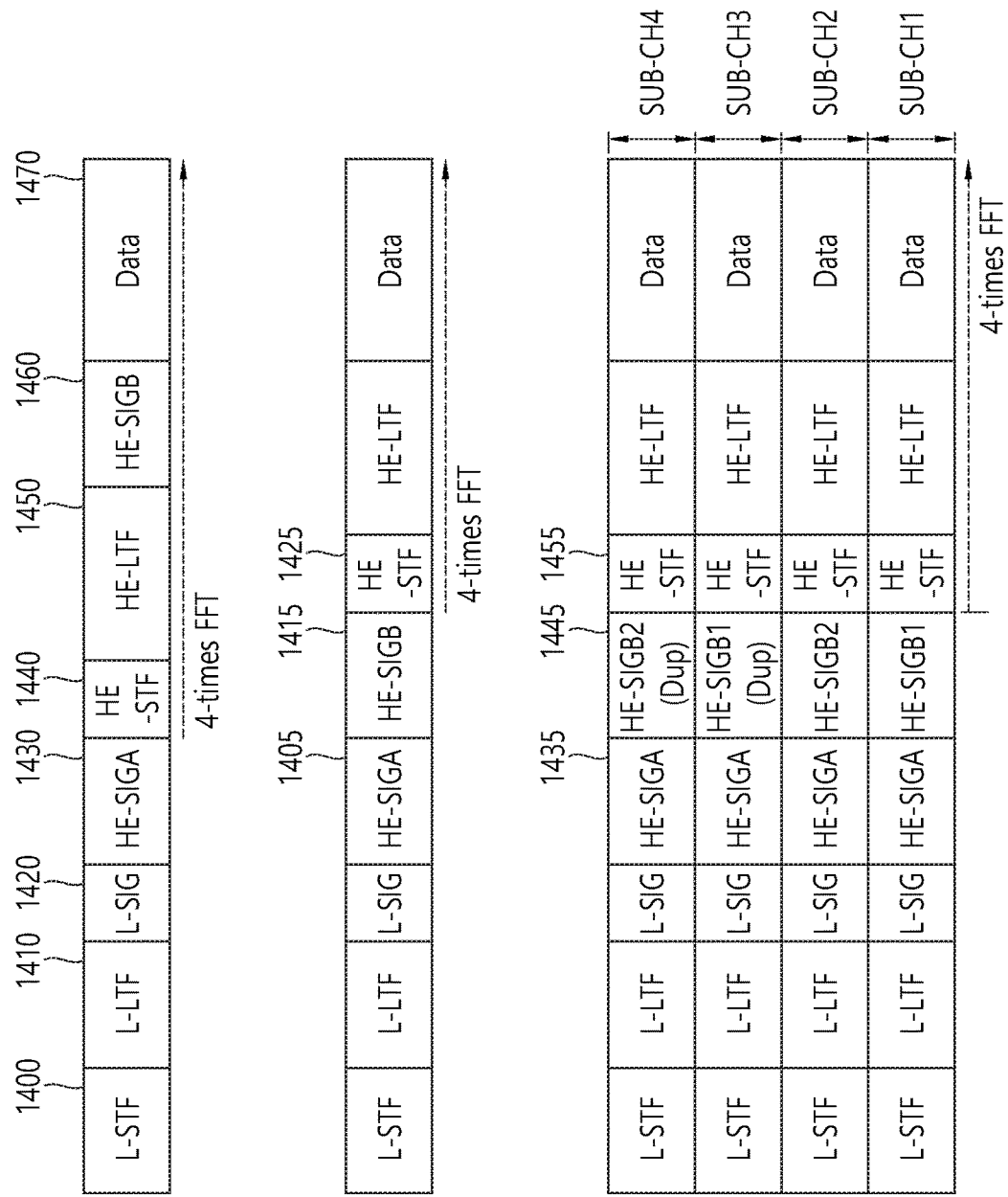
FIG. 14 is a conceptual view illustrating a PPDU format according to an exemplary embodiment of the present invention.

FIG. 14 is a conceptual view illustrating a PPDU format according to an exemplary embodiment of the present invention.

FIG. 14 discloses a PPDU format according to the exemplary embodiment of the present invention.

Referring to the upper part of FIG. 14, a PPDU header of a downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PPDU may be divided into a legacy part, which consists of a part starting from the PHY header to the L-SIG, and a high efficiency (HE) part, which consists of a part after the L-SIG.

The L-STF 1400 may include a short training orthogonal frequency division multiplexing (OFDM) symbol. The L-STF 1400 may be used for frame detection, automatic gain control (AGC), diversity detection, and coarse frequency/time synchronization.

The L-LTF 1410 may include a long training orthogonal frequency division multiplexing (OFDM) symbol. The L-LTF 1410 may be used for fine frequency/time synchronization and channel prediction.

The L-SIG 1420 may be used for transmitting control information. The L-SIG 1420 may include information on data transmission rate, data length, and so on.

The HE-SIG A 1430 may also include information STA for indicating a STA that is to receive the PPDU. For example, the RE-SIG A 1430 may include an identifier of a specific STA (or AP) that is to receive the PPDU and information for indicating a group of the specific STA. Also, in case the PPDU is transmitted based on the OFDMA or MIMO, the HE-SIG A 1430 may also include resource allocation information corresponding to the STA.

Additionally, the HE-SIG A 1430 may also include color bits information for BSS identification information, bandwidth information, tail bit, CRC bit, modulation and coding scheme (MCS) information on the HE-SIG B 1460, information on the number of symbols for the HE-SIG B 1460, and cyclic prefix (CP) (or guard interval (GI)) length information.

The RE-SIG A 1430 may also be expressed by the term HE-SIG 1 (or a primary signal field).

The HE-STF 1440 may be used for enhancing automatic gain control estimation in a multiple input multiple output (MIMO) environment or an OFDMA environment.

The HE-LTF 1450 may be used for estimating a channel in a MIMO environment or an OFDMA environment.

The HE-SIG B 1460 may include information on a length modulation and coding scheme (MCS) of a physical layer service data unit (PSDU) for each STA and a tail bit, and so on. Additionally, the HE-SIG B 1460 may also include information on the STA that is to receive the PPDU and OFDMA-based resource allocation information (or MU-MIMO information). In case the OFDMA-based resource allocation information (or MU-MIMO related information) is included in the HE-SIG B 1460, resource allocation information may not be included in the RE-SIG A 1430.

The HE-SIG B 1460 may also be expressed by the term HE-SIG 2 (or a secondary signal field).

According to the exemplary embodiment of the present invention, as described above, in case a resource allocation signaling bitmap including the resource allocation information is transmitted from the HE-SIG B 1460, the above-described resource allocation signaling bitmap interpretation information may be transmitted from the HE-SIG A 1430, which is transmitted before the HE-SIG B 1460. In case the resource allocation signaling bitmap interpretation information is transmitted through the HE-SIG A 1430, the decoding complexity of the resource allocation signaling bitmap that is transmitted through the HE-SIG B 1460 may be reduced. Alternatively, the resource allocation signaling bitmap interpretation information and the resource allocation signaling bitmap may both be transmitted to the HE-SIG B 1460, and, when performing information parsing, the resource allocation signaling bitmap interpretation information is decoded firsthand within the HE-SIG B 1460. Thereafter, the resource allocation signaling bitmap may be decoded based on the decoded bitmap interpretation information.

The IFFT size being applied to the HE-STF 1440 and the field after the HE-STF 1440 may be different from the IFFT size being applied to the field before the HE-STF 1440. For example, the IFFT size being applied to the HE-STF 1440 and the field after the HE-STF 1440 may be 4 times larger than the IFFT size being applied to the field before the HE-STF 1440. The STA may receive the HE-SIG A 1430 and may receive indication to receive the downlink PPDU based on the RE-SIG A 1430. In this case, the STA may perform decoding based on the FFT size, which is changed starting from the HE-STF 1440 and the field after the HE-STF 1440. Conversely, in case the STA fails to receive indication to receive the downlink PPDU based on the RE-SIG A 1430, the STA may stop the decoding process and may perform network allocation vector (NAV) configuration. A cyclic prefix (CP) of the HE-STF 1440 may have a size that is larger than the CP of other fields, and, during such CP period, the STA may change the FFT size and may perform decoding on the downlink PPDU.

The order of the fields configuring the format of the PPDU shown in the upper part of FIG. 14 may also be changed. For example, as shown in the middle part of FIG. 14, the HE-SIG B 1415 may be positioned immediately after the HE-SIG A 1405. The STA may perform decoding up to the RE-SIG A 1405 and the HE-SIG B 1415 and may receive the required control information and may then perform NAV configuration. Similarly, the IFFT size being applied to the HE-STF 1425 and the field after the HE-STF 1425 may be different from the IFFT size being applied to the field before the HE-STF 1425.

The STA may receive the RE-SIG A 1405 and the RE-SIG B 1415. In case the reception of the PPDU is indicated based on the RE-SIG A 1405, the STA may change the FFT size starting from the HE-STF 1425 and may then perform decoding on the PPDU. Conversely, the STA may receive the HE-SIG A 1405, and, in case the reception of the downlink PPDU is not indicated based on the HE-SIG A 1405, the network allocation vector (NAV) configuration may be performed.

Referring to the lower part of FIG. 14, a PPDU format for the downlink (DL) multi-user (MU) OFDMA transmission is disclosed. According to the exemplary embodiment of the present invention, the AP may transmit a downlink frame or downlink PPDU by using a PPDU format for DL MU OFDMA transmission. Each of the plurality of downlink PPDUs may be transmitted to each of the plurality of STAs through different transmission resources (frequency resources or spatial streams). In the PPDU, a previous field of the HE-SIG B 1445 may be transmitted from transmission resources each being different from one another in a duplicated format. In case of the HE-SIG B 1445, the HE-SIG B 1445 being transmitted from some of the subchannels (e.g., subchannel1, subchannel2) may correspond to an independent field including individual information, and the HE-SIG B 1445 being transmitted from the remaining subchannels (e.g., subchannel3, subchannel4) may correspond to a duplicated format of the HE-SIG B 1445 being transmitted from other subchannels (e.g., subchannel1, subchannel2). Alternatively, the HE-SIG B 1445 may be transmitted in an encoded format from the entire transmission resources. The fields after the HE-SIG B 1445 may include separate information for each of the plurality of STAs receiving the PPDU.

For example, the RE-SIG A 1435 may include identification information on the plurality of STAs that are to receive downlink data and information on the channels to which the downlink data of the plurality of STAs are transmitted.

In case each of the fields included in the PPDU is transmitted through each transmission resource, the CRC for each field may be included in the PPDU. Conversely, in case a specific field included in the PPDU is encoded and transmitted over the entire transmission resource, the CRC for each field may not be included in the PPDU. Therefore, the overhead for the CRC may be reduced.

Similarly, in the PPDU format for the DL MU transmission, the HE-STF 1455 and the field after the HE-STF 1455 may also be encoded based on an IFFT size that is different from the field before the HE-STF 1455. Therefore, in case the STA receives the RE-SIG A 1435 and the HE-SIG B 1445 and receives an indication on the reception of the PPDU based on the HE-SIG A 1435, the STA may change the FFT size starting from the HE-STF 1455 and may then perform decoding on the PPDU.

Figure 15:
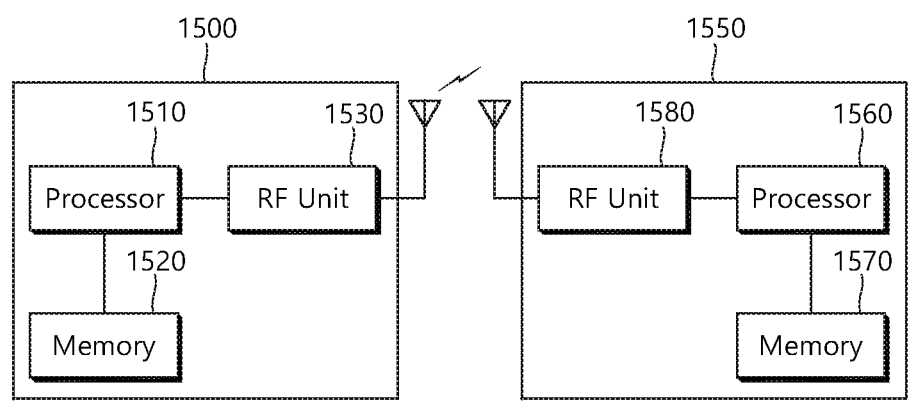
FIG. 15 is a block view illustrating a wireless device to which the exemplary embodiment of the present invention can be applied.

FIG. 15 is a block view illustrating a wireless device to which the exemplary embodiment of the present invention can be applied.

Referring to FIG. 15, as an STA that can implement the above-described exemplary embodiment, the wireless device 1500 may correspond to an AP 1500 or a non-AP station (STA) 1550.

The AP 1500 includes a processor 1510, a memory 1520, and a radio frequency (RF) unit 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be implemented to perform the operations of the AP according to the above-described exemplary embodiments of the present invention. The processor may perform the operations of the AP, which are disclosed in the exemplary embodiments of FIG. 1 to FIG. 14.

For example, the processor 1510 may be configured to allocate each of the plurality of wireless resources for each of the plurality of stations (STAs) being included in the basic service set (BSS) within the entire bandwidth and to transmit each of the plurality of wireless resources to each of the plurality of STAs through a physical protocol data unit (PPDU). Each of the plurality of wireless resources may correspond to a combination of a plurality of wireless resource units that are each defined to have a different size within the frequency axis. Additionally, each of the plurality of wireless resources may be determined by considering the bandwidth size of at least one STA, among the plurality of STAs, wherein the at least one STA supports a bandwidth having a size that is smaller than that of the entire bandwidth. At this point, each of the plurality of wireless resources may be determined with the exception for a direct current (DC) tone transmission unit and a guard tone transmission unit within the entire bandwidth. The DC tone transmission unit may correspond to a wireless resource unit corresponding to the position of a DC tone within the bandwidth of at least one STA. And, the guard tone transmission unit may correspond to a wireless resource unit corresponding to the position of a guard tone within the bandwidth of at least one STA. The DC tone transmission unit and the guard tone transmission unit may be varied in accordance with the bandwidth size of at least one STA. The PPDU that is being transmitted by the AP may include information on the DC tone transmission unit and the guard tone transmission unit.

The plurality of wireless resource units configuring the plurality of wireless resources being allocated to the plurality of STAs by the AP may include a primary wireless resource unit and a secondary wireless resource unit. The number of tones being allocated to the primary wireless resource unit may be larger than the number of tones being allocated to the secondary wireless resource unit. Each of the plurality of wireless resources being allocated to the plurality of STAs by the AP may include one logical combination resource unit, which is defined based on a combination of at least one primary wireless resource unit and at least one secondary wireless resource unit.

The STA 1450 includes a processor 1460, a memory 1470, and a radio frequency (RF) unit 1480.

The RF unit 1480 is connected to the processor 1460, thereby being capable of transmitting and/or receiving radio signals.

The processor 1460 implements the functions, processes, and/or methods proposed in the present invention. For example, the processor 1460 may be implemented to perform the operations of the STA according to the above-described exemplary embodiments of the present invention. The processor may perform the operations of the STA, which are disclosed in the exemplary embodiments of FIG. 1 to FIG. 14.

For example, the processor 1560 may be configured to acquire information on the DC tone transmission unit and the guard tone transmission unit and to determine the resource being allocated for the STA. Additionally, the processor 1560 may be configured to transmit in advance information on a supportable bandwidth (or front-end) to the AP for resource allocation.

The processor 1510 and 1560 may include an application-specific integrated circuit (ASIC), another chip set, a logical circuit, a data processing device, and/or a converter converting a baseband signal and a radio signal to and from one another. The memory 1520 and 1570 may include a read-only memory (ROM), a random access memory (RAM), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A method used in a wireless local area network (WLAN), the method comprising:
receiving, by a station (STA), a physical protocol data unit (PPDU) including a signal field,
wherein a plurality of resource units (RUs) are allocated within the PPDU based on orthogonal frequency division multiple access (OFDMA),
wherein the plurality of RUs include a basic tone unit (BTU) and a small tone unit (STU) having a number of tones being less than that of the BTU,
wherein direct current (DC) tones of the PPDU are allocated between two STUs of the PPDU,
wherein the two STUs are allocated for the STA,
wherein the signal field includes allocation information related to the two STUs; and
decoding, by the STA, the two STUs based on the signal field.

2. The method of claim 1, wherein each STU has 13 contiguous tones.

3. The method of claim 1, wherein each BTU has 26 contiguous tones.

4. The method of claim 1, wherein the PPDU further includes a data field, and the STA decodes the data field based on the two STUs.

5. The method of claim 1, wherein a bandwidth of the PPDU is one of 20 MHz, 40 MHz, 80 MHz, and 160 MHz.

6. The method of claim 1, wherein the PPDU is a high efficiency (HE) PPDU.

7. A station (STA) in a wireless local area network (WLAN), comprising:
 a receiver configured to receiving a wireless signal; and
 a processor configured to control the receiver,
  wherein the processor is further configured to:
   receive, via the receiver, a physical protocol data unit (PPDU) including a signal field,
   wherein a plurality of resource units (RUs) are allocated within the PPDU based on orthogonal frequency division multiple access (OFDMA),
   wherein the plurality of RUs include a basic tone unit (BTU) and a small tone unit (STU) having a number of tones being less than that of the BTU,
   wherein direct current (DC) tones of the PPDU are allocated between two STUs of the PPDU,
   wherein the two STUs are allocated for the STA,
   wherein the signal field includes allocation information related to the two STUs; and
   decode the two STUs based on the signal field.

8. The STA of claim 7, wherein each STU has 13 contiguous tones.

9. The STA of claim 7, wherein each BTU has 26 contiguous tones.

10. The STA of claim 7, wherein the PPDU further includes a data field, and the processor is further configured to decode the data field based on the two STUs.

11. The STA of claim 7, wherein a bandwidth of the PPDU is one of 20 MHz, 40 MHz, 80 MHz, and 160 MHz.

12. The STA of claim 7, wherein the PPDU is a high efficiency (HE) PPDU.

13. An access point (AP) in a wireless local area network (WLAN), comprising:
 a transmitter configured to transmit a wireless signal to a station (STA); and
 a processor configured to control the transmitter,
  wherein the processor is further configured to:
   configure a physical protocol data unit (PPDU) including a signal field,
   wherein a plurality of resource units (RUs) are allocated within the PPDU based on orthogonal frequency division multiple access (OFDMA),
   wherein the plurality of RUs include a basic tone unit (BTU) and a small tone unit (STU) having a number of tones being less than that of the BTU,
   wherein direct current (DC) tones of the PPDU are allocated between two STUs of the PPDU,
   wherein the two STUs are allocated for the STA,
   wherein the signal field includes allocation information related to the two STU; and
   transmit, via the transmitter, the PPDU to the STA.

14. The AP of claim 13, wherein each STU has 13 contiguous tones.

15. The AP of claim 13, wherein each BTU has 26 contiguous tones.

16. The AP of claim 13, wherein the PPDU further includes a data field.

17. The AP of claim 13, wherein a bandwidth of the PPDU is one of 20 MHz, 40 MHz, 80 MHz, and 160 MHz.

18. The AP of claim 13, wherein the PPDU is a high efficiency (HE) PPDU.

* * * * *